US011379777B2

(12) United States Patent
Shepard et al.

(10) Patent No.: US 11,379,777 B2
(45) Date of Patent: Jul. 5, 2022

(54) ESTIMATING A RESULT OF CONFIGURATION CHANGE(S) IN AN ENTERPRISE

(71) Applicant: Microsoft Technology Licensing, LLC, Redmond, WA (US)

(72) Inventors: Marc Shepard, Bellevue, WA (US); Brad R. Anderson, Sammamish, WA (US); David C. James, Snohomish, WA (US); Brett Damon Alan Flegg, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 102 days.

(21) Appl. No.: 16/826,142

(22) Filed: Mar. 20, 2020

(65) Prior Publication Data
US 2021/0158257 A1 May 27, 2021

Related U.S. Application Data

(60) Provisional application No. 62/940,784, filed on Nov. 26, 2019.

(51) Int. Cl.
*G06Q 10/06* (2012.01)
*G06Q 10/00* (2012.01)
(Continued)

(52) U.S. Cl.
CPC .... *G06Q 10/06375* (2013.01); *G01M 99/005* (2013.01); *G06N 5/04* (2013.01);
(Continued)

(58) Field of Classification Search
CPC ............ G06Q 10/06375; G06Q 10/04; G06Q 10/067; G06Q 10/087; G06Q 10/20; G01M 99/05; G06N 5/04
(Continued)

(56) References Cited

U.S. PATENT DOCUMENTS

| 6,857,020 B1* | 2/2005 | Chaar | G06Q 10/10 709/224 |
| 7,231,374 B1* | 6/2007 | Balasinski | G06Q 10/04 705/400 |

(Continued)

FOREIGN PATENT DOCUMENTS

EP   2801938 A1   11/2014

OTHER PUBLICATIONS

SAS strengthens assault on BI market with enhanced offering. Canada NewsWire. Ottawa: Apr. 11, 2005. p. 1.*

(Continued)

*Primary Examiner* — Timothy Padot
(74) *Attorney, Agent, or Firm* — Wade IP Law PLLC

(57) ABSTRACT

Techniques are described herein that are capable of estimating a result of configuration change(s) in an enterprise. Enterprise information regarding a designated enterprise is gathered. The enterprise information is combined with anonymized information that is received from multiple enterprises to provide combined information. An actual impact of configuration changes in at least one enterprise (e.g., with regard to a first subset of the machines therein) is determined and/or a predictive impact of the configuration change(s) in at least one enterprise (e.g., with regard to a second subset of machines therein) is inferred. An estimate of a net financial result of implementing the configuration change(s) (e.g., with regard to the second subset of the machines) in the designated enterprise is generated based at least in part on the actual impact and/or the predictive impact.

20 Claims, 7 Drawing Sheets

(51) Int. Cl.
    *G06Q 10/04*    (2012.01)
    *G01M 99/00*    (2011.01)
    *G06N 5/04*     (2006.01)
    *G06Q 10/08*    (2012.01)

(52) U.S. Cl.
    CPC .......... *G06Q 10/04* (2013.01); *G06Q 10/067* (2013.01); *G06Q 10/087* (2013.01); *G06Q 10/20* (2013.01)

(58) Field of Classification Search
    USPC ...................................................... 705/7.37
    See application file for complete search history.

(56) References Cited

U.S. PATENT DOCUMENTS

| | | | | |
|---|---|---|---|---|
| 2005/0097517 | A1* | 5/2005 | Goin | H04L 43/06 717/124 |
| 2013/0204837 | A1* | 8/2013 | Sabharwal | G06F 16/235 707/E17.005 |
| 2015/0262188 | A1* | 9/2015 | Franco | H04M 3/5158 705/7.21 |
| 2016/0155076 | A1* | 6/2016 | Fix | G06Q 10/06395 705/7.39 |
| 2017/0180201 | A1* | 6/2017 | Guven | G06N 20/00 |
| 2017/0235622 | A1 | 8/2017 | Boyapalle et al. | |
| 2019/0138964 | A1 | 5/2019 | Morita et al. | |
| 2019/0306023 | A1* | 10/2019 | Vasseur | H04L 41/082 |

OTHER PUBLICATIONS

IT integration decisions during mergers and acquisitions. Mehta, Manjari Chaitanya. ProQuest Dissertations and Theses ProQuest Dissertations Publishing. (2005).*

Classifying Server Behavior and Predicting Impact of Modernization Actions. J. Bogojeska, D. Lanyi, I. Giurgiu, G. Stark and D. Wiesmann. Proceedings of the 9th International Conference on Network and Service Management (CNSM 2013), 2013, pp. 59-66.*

"International Search Report & Written Opinion issued in PCT Application No. PCT/US20/059246", dated Feb. 4, 2021, 17 Pages.

* cited by examiner

ESTIMATING A RESULT OF CONFIGURATION CHANGE(S) IN AN ENTERPRISE

CROSS-REFERENCE TO RELATED APPLICATION(S)

This application claims the benefit of U.S. Provisional Application No. 62/940,784, filed Nov. 26, 2019 and entitled "Estimating a Result of Configuration Change(s) in an Enterprise," the entirety of which is incorporated herein by reference.

BACKGROUND

Information technology (IT) professionals typically perform actions (a.k.a. IT actions) to facilitate systems management of an organization's enterprise. One functional component of systems management is configuration management, which involves implementing configuration changes in the enterprise, for example, to maintain integrity of the enterprise. Actions that are performed by the IT professionals often are driven by providing end users of the enterprise with hardware and software they need in a manner that meets the organization's security and compliance standards. However, many IT actions (or inactions), such as those that are performed to deploy software, hardware, and security and compliance settings, have hidden costs.

SUMMARY

Various approaches are described herein for, among other things, estimating a result of configuration change(s) in an enterprise. For instance, the estimated result may be indicated (e.g., communicated) via an enterprise management tool that is used by an administrator to perform systems management of the enterprise. Systems management typically refers to enterprise-wide administration of distributed systems (e.g., computer systems). Some example tasks that may be performed via systems management include but are not limited to anti-manipulation management, anti-virus and anti-malware management, security management, storage management, capacity monitoring, server availability monitoring and metrics, monitoring of user activities, network capacity and utilization monitoring, hardware inventory, and software inventory and installation. Systems management often includes a variety of functional components, including but not limited to data center infrastructure management, help desk management, network management, security information and event management, and configuration management. Configuration management typically handles changes in a system systematically to maintain integrity of the system. Such changes may be implemented for beneficial purposes, including but not limited to revising capability of the system; increasing performance, reliability, and/or maintainability of the system; extending life of the system; reducing cost, risk, and/or liability of the system; and correcting defect(s) of the system.

In an example approach, enterprise information is gathered. The enterprise information may include configuration information, ticket information, and/or performance information. The configuration information indicates configuration changes that are made to a designated enterprise. The ticket information indicates a volume of support tickets that are received with regard to the configuration changes. The performance information indicates performance of machines in the designated enterprise in response to the configuration changes. The enterprise information is combined with anonymized information that is received from multiple enterprises to provide combined information. The anonymized information may include anonymized configuration information, anonymized ticket information, and/or anonymized performance information. The anonymized configuration information indicates configuration changes that are made to the enterprises. The anonymized ticket information indicates a volume of support tickets that are received with regard to the configuration changes that are made to the enterprises. The anonymized performance information indicates performance of machines in the enterprises in response to the configuration changes being made to the enterprises.

In a first aspect of this approach, a predictive impact of configuration change(s) across the enterprises is inferred by using an adaptive algorithm to analyze the combined information. The predictive impact includes a predicted change to performance of machines in the enterprises as a result of the configuration change(s) and a predicted change to a volume of support tickets that are received in the enterprises as a result of the configuration change(s). An estimate of a net financial result of implementing the configuration change(s) in the designated enterprise is generated based at least in part on the predictive impact of the configuration change(s) across the enterprises.

In a second aspect of this approach, an actual impact of configuration change(s) in at least one enterprise is determined. The actual impact includes an actual change to performance of machines in the at least one enterprise as a result of the configuration change(s) and an actual change to a volume of support tickets that are received with regard to the configuration change(s) in the at least one enterprise. An estimate of a net financial result of implementing the configuration change(s) in the designated enterprise is generated based at least in part on the actual impact of the configuration change(s) in the at least one enterprise.

In a third aspect of this approach, an actual impact of configuration change(s) with regard to a first subset of the machines in the designated enterprise is determined. The actual impact includes an actual change to performance of the first subset of the machines in the designated enterprise as a result of the configuration change(s) and an actual change to a volume of support tickets that are received in response to the configuration change(s) with regard to the first subset of the machines in the designated enterprise. A predictive impact of the configuration change(s) with regard to a second subset of the machines in the designated enterprise is inferred by using an adaptive algorithm to analyze the combined information. The predictive impact includes a predicted change to performance of the second subset of the machines in the designated enterprise as a result of the configuration change(s) and a predicted change to a volume of support tickets that are received in response to the configuration change(s) with regard to the second subset of the machines in the designated enterprise. An estimate of a net financial result of implementing the configuration change(s) with regard to the second subset of the machines in the designated enterprise is generated based at least in part on the actual impact of the configuration change(s) with regard to the first subset of the machines in the designated enterprise and further based at least in part on the predictive impact of the configuration change(s) with regard to the second subset of the machines in the designated enterprise.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

Figure 1:
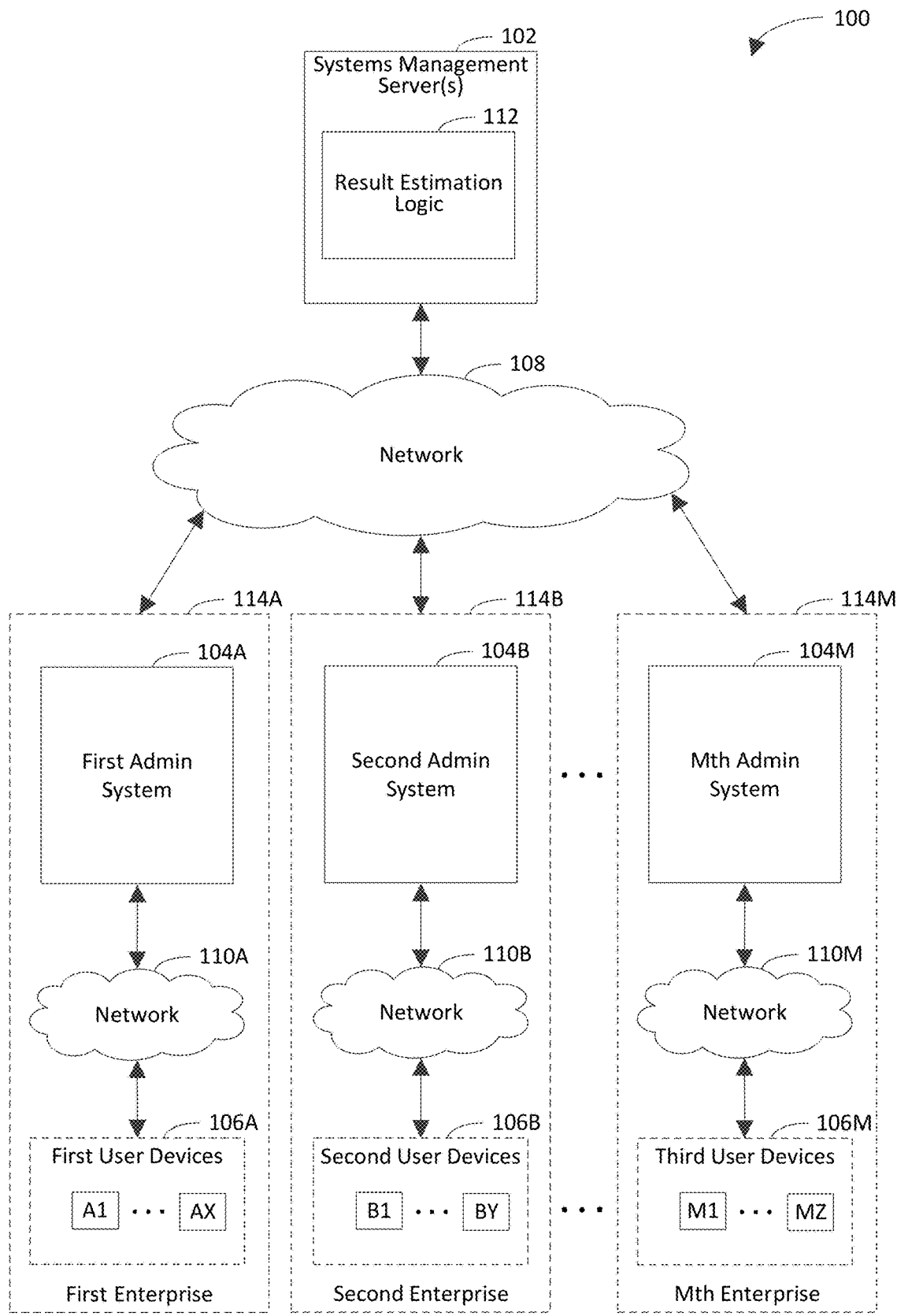
FIG. 1 is a block diagram of a result estimation system in accordance with an embodiment.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

Descriptors such as "first", "second", "third", etc. are used to reference some elements discussed herein. Such descriptors are used to facilitate the discussion of the example embodiments and do not indicate a required order of the referenced elements, unless an affirmative statement is made herein that such an order is required.

II. Example Embodiments

Example embodiments described herein are capable of estimating a result of configuration change(s) in an enterprise. Examples of a configuration change include but are not limited to deployment of software (e.g., an update to the software), changing hardware, changing security setting(s), and changing compliance setting(s). For instance, the estimated result may be indicated (e.g., communicated) via an enterprise management tool that is used by an IT professional (e.g., an administrator) to perform systems management of the enterprise. Systems management typically refers to enterprise-wide administration of distributed systems (e.g., computer systems). Some example tasks that may be performed via systems management include but are not limited to anti-manipulation management, anti-virus and anti-malware management, security management, storage management, capacity monitoring, server availability monitoring and metrics, monitoring of user activities, network capacity and utilization monitoring, hardware inventory, and software inventory and installation. Systems management often includes a variety of functional components, including but not limited to data center infrastructure management, help desk management, network management, security information and event management, and configuration management. Configuration management typically handles changes in a system systematically to maintain integrity of the system. Such changes may be implemented for beneficial purposes, including but not limited to revising capability of the system; increasing performance, reliability, and/or maintainability of the system; extending life of the system; reducing cost, risk, and/or liability of the system; and correcting defect(s) of the system.

Example techniques described herein have a variety of benefits as compared to conventional systems management techniques. For instance, the example techniques may be capable of estimating a result of configuration change(s) in an enterprise. The estimate of the result may include an estimate of a net financial result of implementing the configuration change(s) in the enterprise. The net financial result may take into consideration an initial cost associated with implementing the configuration change(s) (e.g., a cost of decreasing end user productivity during the implementation) and a reduction in on-going cost associated with the enterprise (e.g., a financial benefit of increasing end user productivity once the implementation is completed). The net financial result may be based on any of a variety of factors, including but not limited to a predictive impact of the configuration change(s) across one or more enterprises, the actual impact of the configuration change(s) across one or more enterprises, or a combination thereof. The example techniques may provide insight to an IT professional as to traditionally hidden costs associated with implementation of configuration change(s) in an enterprise. Examples of such a traditionally hidden cost include but are not limited to a cost associated with (e.g., resulting from) a reduction in productivity of end users in the enterprise and a cost associated with an increase in an amount of support tickets (e.g., per unit of time) that are received from end users in the enterprise. The example techniques may lead to more effective planning and decision-making with regard to systems management of an enterprise by providing visibility into the overall cost of implementing configuration change(s) in the enterprise.

The example techniques may reduce an amount of time and/or resources (e.g., processor cycles, memory, network bandwidth) that is consumed to manage a system. The example techniques may reduce a cost associated with managing the system. For instance, by generating the estimate of the net financial result of implementing the configuration change(s), implementation of configuration change(s) having a net financial result that is greater than a threshold amount may not be performed, or one or more of the configuration change(s) may be modified to reduce the net financial result. The example techniques may increase efficiency of a computing system that performs systems management operations for the enterprise. For instance, the computing system may be configured to not implement configuration changes if an estimate of a net financial cost of the implementation exceeds a cost threshold, or the computing system may be configured to modify one or more of the configuration changes to reduce the financial cost of the implementation below the cost threshold.

Moreover, by generating an estimate of a net financial result of implementing configuration change(s), an IT professional need not necessarily spend time manually performing calculations to estimate the net financial result. Reducing the time spent by the IT professional to manage the system results in a reduced cost associated with the IT professional. The example techniques may increase efficiency of an IT professional. For instance, by generating the estimate of the net financial result of implementing the configuration change(s), the example techniques may reduce a number of steps that are performed by the IT professional, an amount of effort that the IT professional expends, and/or an amount of time that the IT professional takes to oversee the systems management of the enterprise.

The example techniques may increase efficiency of an end user. For example, implementation of configuration change(s) in the enterprise may result in substantial downtime of the end user. By generating the estimate of the net financial result of implementing the configuration change(s), mitigating steps may be taken to reduce the downtime of the end user. For instance, implementation of configuration change(s) that consumes more than a threshold amount of time may be delayed until the end user is not interacting with a computing device that is to be impacted by the configuration change(s), one or more of the configuration change(s) may be selectively excluded from the implementation, or one or more of the configuration change(s) may be modified such that the downtime of the end user is reduced. By reducing the downtime of the end user that results from the implementation, a portion of the cost of the implementation that is attributable to the end user is reduced.

FIG. 1 is a block diagram of an example result estimation system 100 in accordance with an embodiment. Generally speaking, result estimation system 100 operates to perform system configuration operations with regard to enterprises 114A-114M (e.g., customer environments). As shown in FIG. 1, the result estimation system 100 includes systems management server(s) 102 and the enterprises 114A-114M. Communication between the systems management server(s) 102 and the enterprises 114A-114M is carried out over a network 108 using well-known network communication protocols. The network 108 may be a wide-area network (e.g., the Internet), a local area network (LAN), another type of network, or a combination thereof.

Each of the enterprises 114A-114M includes an admin system 104, a network 110, and user devices 106. For instance, a first enterprise 114A includes a first admin system 104A, a first network 110A, and first user devices 106A. A second enterprise 114B includes a second admin system 104B, a second network 110B, and second user devices 106B. An Mth admin system 104M includes an Mth admin system 104M, an Mth network 110M, and Mth user devices 106M. In each of the enterprises 114A-114M, communication between the admin system 104 and the user devices 106 is carried out over the network 110 using well-known network communication protocols. The network 110 may be a wide-area network (e.g., the Internet), a local area network (LAN), another type of network, or a combination thereof.

In each of the enterprises 114A-114M, the user devices 106 are processing systems that are capable of communicating the admin system 104. An example of a processing system is a system that includes at least one processor that is capable of manipulating data in accordance with a set of instructions. For instance, a processing system may be a computer, a personal digital assistant, etc. The user devices 106 are configured to provide requests to servers (not shown) for requesting information stored on (or otherwise accessible via) the servers. For instance, a user may initiate a request for executing a computer program (e.g., an application) using a client (e.g., a Web browser or other type of client) deployed on a user device that is owned by or otherwise accessible to the user. In accordance with some example embodiments, user devices 106 are capable of accessing domains (e.g., Web sites) hosted by the servers, so that the user devices 106 may access information that is available via the domains. Such domains may include Web pages, which may be provided as hypertext markup language (HTML) documents and objects (e.g., files) that are linked therein, for example.

Each of the user devices 106 may include any client-enabled system or device, including but not limited to a desktop computer, a laptop computer, a tablet computer, a wearable computer such as a smart watch or a head-mounted computer, a personal digital assistant, a cellular telephone, an Internet of things (IoT) device, or the like. It will be recognized that any one or more of the user devices 106 may communicate with any one or more of the servers.

The user devices 106 are also configured to provide information to the admin system 104 automatically or in responses to inquiries from the admin system 104. For instance, such information may pertain to hardware and/or software configurations of the user devices 106 (e.g., updates thereof), workloads of the user devices 106, resource utilization on the user devices, etc.

The admin system 104 is a processing system that is capable of communicating with the user devices 106. The admin system 104 is configured to perform operations to facilitate systems management of the enterprise 114 in response to instructions that are received from the IT administrator of the enterprise 114. For example, the admin system 104 may provide commands to the systems management server(s) 102, indicating configuration changes that are to be implemented by the systems management server(s) 102 to perform systems management of the enterprise 114. In another example, the admin system 104 may provide requests for information to the user devices 106. The IT administrator may make decisions regarding systems management of the user devices 106 and/or the network 110 based at least in part on the information that is received from the user devices 106. It will be recognized that at least some (e.g., all) of the information may be gathered by the systems management server(s) 102, rather than by the admin system 104.

The systems management server(s) 102 are processing systems that are capable of communicating with enterprises 114A-114M. For instance, the systems management server(s) 102 may be capable of communicating with the admin system 104 and/or the user devices 106 in each enterprise 114. The systems management server(s) 102 include result estimation logic 112. The result estimation logic 112 is configured to provide information to and/or gather information from the admin server 104 and/or the user devices 106 in each enterprise 114 for purposes of performing systems management of the enterprise 114. For instance, the result estimation logic 112 may push information to the user devices 106 or provide the information in response to requests that are received from the user devices 106. The requests may be user-generated or generated without user involvement. For example, policies that are applied to a user device are done without explicit user requests. In accordance with this example, the policies are applied in the background even if no user is logged onto the user device. In further accordance with this example, the user device (e.g., an agent thereon) may poll a server for policy on a schedule (e.g., once per hour) or on events (e.g., device wakeup, user unlock, etc.). In further accordance with this example, the server may push the policy to the user device (e.g., an agent thereon) via an open HTTP endpoint.

In accordance with example embodiments described herein, the result estimation logic 112 gathers enterprise information. The enterprise information may include configuration information, ticket information, and/or performance information. The configuration information indicates configuration changes that are made to a designated enterprise (e.g., any one of the enterprises 114A-114M). The ticket information indicates a volume of support tickets that are received with regard to the configuration changes. The performance information indicates performance of machines in the designated enterprise (e.g., first user devices 106A in enterprise 114A, second user devices 106B in enterprise 114B, . . . , or Mth user devices 106M in enterprise 114M) in response to the configuration changes. For instance, the performance information may indicate a boot time, login time, application launch time, crash rate, network latency, and/or resource consumption (e.g., CPU, disk, or battery consumption) for any one or more of the machines in the designated enterprise. The result estimation logic 112 combines the enterprise information with anonymized information that is received from multiple enterprises (e.g., any two or more of the enterprises 114A-114M) to provide combined information. The multiple enterprises may or may not include the designated enterprise. The anonymized information may include anonymized configuration information, anonymized ticket information, and/or anonymized performance information. The anonymized configuration information indicates configuration changes that are made to the enterprises. The anonymized ticket information indicates a volume of support tickets that are received with regard to the configuration changes that are made to the enterprises. The anonymized performance information indicates performance of machines in the enterprises in response to the configuration changes being made to the enterprises. The anonymized information may be averaged across the enterprises, though the example embodiments are not limited in this respect. For example, such averaged information may serve as a baseline against which to compare the enterprise information. In another example, previously gathered enterprise information regarding the designated enterprise may serve as a baseline against which to compare the enterprise information.

In a first example implementation, the result estimation logic 112 infers a predictive impact of configuration change(s) across the enterprises by using an adaptive algorithm to analyze the combined information. The predictive impact includes a predicted change to performance of machines in the enterprises as a result of the configuration change(s) and a predicted change to a volume of support tickets that are received in the enterprises as a result of the configuration change(s). In an example scenario, the configuration change(s) may include deployment of a security feature, and the predictive impact may indicate that deployment of the security feature is likely to reduce boot performance (e.g., increase boot times), negatively impact login attempts (e.g., increase login times) due to multi-factor authorization prompts, and/or increase the volume of support tickets in the enterprises. The result estimation logic 112 generates an estimate of a net financial result of implementing the configuration change(s) in the designated enterprise based at least in part on the predictive impact of the configuration change(s) across the enterprises.

In a second example implementation, the result estimation logic 112 determines an actual impact of configuration change(s) in at least one enterprise (e.g., at least one of the enterprises 114A-114M). The actual impact includes an actual change to performance of machines in the at least one enterprise as a result of the configuration change(s) and an actual change to a volume of support tickets that are received with regard to the configuration change(s) in the at least one enterprise. In an example scenario, the actual impact may indicate that the configuration change(s) have resulted in an application no longer working (e.g., failing to execute) and/or a volume of support tickets in the at least one enterprise increasing. The result estimation logic 112 generates an estimate of a net financial result of implementing the configuration change(s) in the designated enterprise based at least in part on the actual impact of the configuration change(s) in the at least one enterprise. In an example scenario, by translating the actual impact of the configuration change(s) into end user time disruption and then to actual cost based at least in part on the end users' fully loaded cost per hour and an estimated cost (e.g., a historical cost) of handling a support ticket, the estimation logic 112 may generate the estimate of the net financial result.

In a third example implementation, the result estimation logic 112 determines an actual impact of configuration change(s) with regard to a first subset of the machines in the designated enterprise. The actual impact includes an actual change to performance of the first subset of the machines in the designated enterprise as a result of the configuration change(s) and an actual change to a volume of support tickets that are received in response to the configuration change(s) with regard to the first subset of the machines in the designated enterprise. The result estimation logic 112 infers a predictive impact of the configuration change(s) with regard to a second subset of the machines in the designated enterprise by using an adaptive algorithm to analyze the combined information. The predictive impact includes a predicted change to performance of the second subset of the machines in the designated enterprise as a result of the configuration change(s) and a predicted change to a volume of support tickets that are received in response to the configuration change(s) with regard to the second subset of the machines in the designated enterprise. The result estimation logic 112 generates an estimate of a net financial result of implementing the configuration change(s) with regard to the second subset of the machines in the designated enterprise based at least in part on the actual impact of the configuration change(s) with regard to the first subset of the machines in the designated enterprise and further based at least in part on the predictive impact of the configuration change(s) with regard to the second subset of the machines in the designated enterprise. Accordingly, the third example implementation may enable prediction of an incremental financial impact of rolling out the configuration change(s) from pilot machines (e.g., the first subset of the machines) to production machines (e.g., the second subset of the machines) in the designated enterprise.

In the first, second, and third example implementations described above, the net financial result may be a net positive amount (e.g., a net financial gain) or a net negative amount (e.g., a net financial loss), depending on whether a combination of the various financial factors on which the net financial result is based is positive or negative, respectively.

It will be recognized that at least some of the aforementioned functionality may be implemented by the admin system 104, rather than by the result estimation logic 112. For example, if the administrator does not want to provide information to the systems management server(s) 102 and instead wishes to only receive information from the systems management server(s) 102, the admin system 104 may gather the enterprise information regarding the designated enterprise. The admin system 104 may combine the enterprise information with the anonymized information to provide the combined information. The admin system 104 may determine the actual impact of the configuration change(s) and/or infer the predictive impact of the configuration change(s). The admin system 104 may generate the estimate of the net financial result based at least in part on the actual impact and/or the predictive impact.

The result estimation logic 112 may be implemented in various ways to estimate a result of configuration change(s) in an enterprise, including being implemented in hardware, software, firmware, or any combination thereof. For example, at least a portion of the result estimation logic 112 may be implemented as computer program code configured to be executed in one or more processors. In another example, at least a portion of the result estimation logic 112 may be implemented as hardware logic/electrical circuitry. For instance, at least a portion of the result estimation logic 112 may be implemented in a field-programmable gate array (FPGA), an application-specific integrated circuit (ASIC), an application-specific standard product (ASSP), a system-on-a-chip system (SoC), a complex programmable logic device (CPLD), etc. Each SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

The result estimation logic 112 is shown to be incorporated in the systems management server(s) 102 for illustrative purposes and is not intended to be limiting. It will be recognized that the result estimation logic 112 (or any portion(s) thereof) may be incorporated in the admin system 104 and/or any one or more of the user devices 106. For example, client-side aspects of the result estimation logic 112 may be incorporated in the admin system 104 and/or one or more of the user devices 106, and server-side aspects of the result estimation logic 112 may be incorporated in the systems management server(s) 102.

Figure 2:
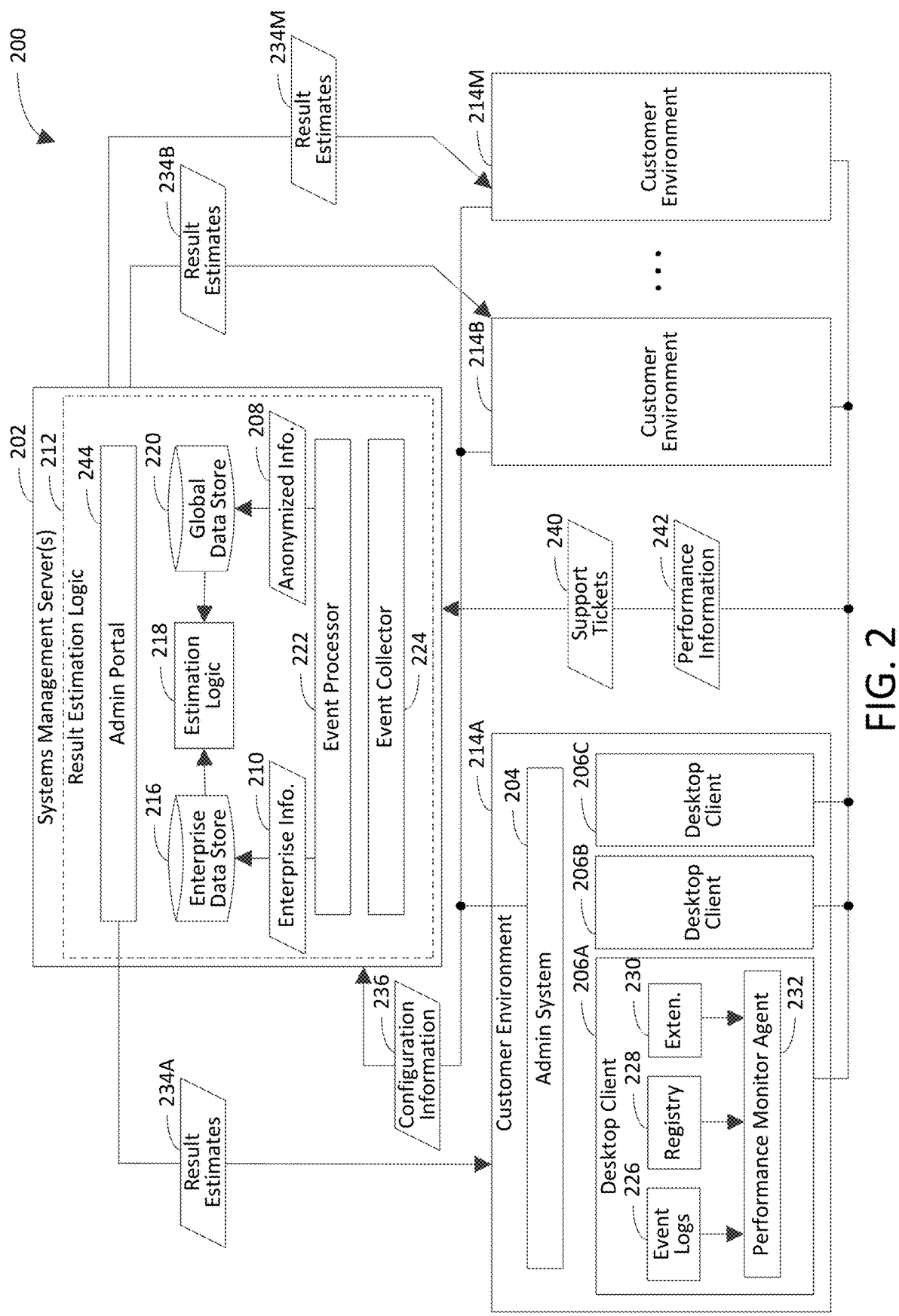
FIG. 2 is a block diagram of an example implementation of a result estimation system shown in FIG. 1 in accordance with an embodiment.

FIG. 2 is a block diagram of a result estimation system 200, which is an example implementation of a result estimation system 100 shown in FIG. 1, in accordance with an embodiment. The result estimation system 200 may be configured to measure key device metrics and changes in an enterprise and to compare those metrics and changes against corporate and global baselines to achieve insights, such as a net financial result of implementing the changes in the enterprise. As shown in FIG. 2, the result estimation system 200 includes systems management server(s) 202 and customer environments 214A-214C. Communication between the systems management server(s) 202 and the customer environments 214 may be carried out over a network using well-known network communication protocols, for example. The systems management server(s) 202 include result estimation logic 212. The result estimation logic 212 is configured to estimate results of configuration changes in customer environments 214A-214M. The result estimation logic 212 includes an admin portal 244, and enterprise store 216, estimation logic 218, a global data store 220, an event processor 222, and an event collector 224. The event collector 224 collects event information, which includes configuration information 236, support tickets 240, and performance information 242. For example, the event collector 224 collects the configuration information 236 from admin systems in the respective customer environments 214A-214M. In accordance with this example, the event collector 240 collects the support tickets 240 and the performance information 242 from desktop clients in the customer environments 214A-214M. The configuration information 236 and the performance information 242 are the same as the configuration information and the performance information described above with reference to the result estimation system 100 of FIG. 1. Each of the support tickets indicates a technical issue that an end user has encountered with regard to the desktop client of the end user.

The event processor 222 processes the event information that is received from the event collector 224. For example, the event processor 222 generates ticket information based at least in part on the support tickets 240. The ticket information indicates a volume of the support tickets 240 that are received with regard to configuration changes that are indicated by the configuration information 236. The event processor 222 may cross-reference the support tickets 240 with the configuration changes based at least in part on time instance(s) at which the configuration changes are implemented, time instance(s) at which the support tickets 240 are received, aspects of the enterprise that are to be impacted by the configuration changes, and/or aspects of the enterprise that the support tickets 240 indicate to have encountered an issue. By cross-referencing the support tickets 240 with the configuration changes, the event processor 222 may determine a likelihood that each of the support tickets 240 pertains to the configuration changes. The event processor 222 may use the likelihoods to determine the volume of the support tickets 240 that are received with regard to the configuration changes. The event processor 222 may identify enterprise information 210 for each of the enterprises 214A-214M. The enterprise information 210 for each of enterprise includes (e.g., consists of) enterprise specific information for that enterprise. For instance, the event processor 222 may filter the event information to identify portions of the event information that pertain to each enterprise. The event processor 222 may designate the portions of the event information that pertain to each enterprise to be the enterprise information 210 for that enterprise. The event processor 222 may generate anonymized information 208 by aggregating the event information from the various enterprises 214A-214M and removing any information that is capable of being used to identify from which of the customer environments 214A the various portions of the event information is received.

The enterprise data store 216 stores the enterprise information 210. The global data store 220 stores the anonymized information 208. The estimation logic 218 generates result estimates 234A-234M for the respective customer environments 214A-214M. The result estimates for a customer environment include an estimate of a net financial result of implementing configuration change(s) in the customer environment based at least in part on an analysis of the enterprise information 210 for that enterprise and the anonymized information 208. The estimation logic 218 may generate each of the result estimates 234A-234M based at least in part on an actual impact of the configuration change(s) on device metrics (e.g., device downtime, user switching devices, user interaction time, user productivity) and/or a predictive impact of the configuration change(s) in one or more of the customer environments 214A-214M. For instance, the actual impact may be determined based at least in part on the performance information 242 and the support tickets 240 that are received from one or more of the customer environments 214A-214M in response to implementation of the configuration change(s) therein. Because the actual impact may be based on data from fewer than all of the enterprises 234A-234M (e.g., a single enterprise), a set of variables that are used to determine the actual impact may be narrowed in scope. For instance, rather than using a variable corresponding to a relatively broad category, multiple variables corresponding to sub-categories of the relatively broad category may be used.

In an example embodiment, the estimation logic 218 trains a machine learning model with data from the customer environments 214A-214M to predict changes to the device metrics and the support ticket volumes due to the configuration change(s). In another example embodiment, the estimation logic 218 includes a customized rule engine that uses the data from the customer environments 214A-214M to predict the changes to the device metrics and the support ticket volumes due to the configuration change(s). In accordance with these embodiments, the data from the customer environments 214A-214M may include the enterprise information and/or the anonymized information described above with reference to FIG. 1. The estimation logic 218 may be capable of expressing an expected impact in the form "X % of <devices | users> with <common characteristics> will see a Y % regression in <metric> due to <configuration change>." The set of all possible configuration changes may be quite broad, which may result in a substantial amount of data and scoping to a manageable subset of predictive variables (characteristics and configuration changes) based on data analysis. The estimation logic 218 may seek metric regressions on all devices and end users, trace back to a set of root causes, and then use a clustering algorithm to identify common attributes of affected devices and end users.

The estimation logic 218 may calculate the net financial result of the configuration change(s) by translating the impact (e.g., actual impact and/or predictive impact) of the device metric changes into end user time disruption, determining a per-end-user fully loaded cost per hour, determining an estimated cost of handling each support ticket, and adding (a) a product of the end user time disruption and the per-end-user fully loaded cost per hour and (b) an estimated time to handle the support tickets that result from implementation of the configuration change(s) and the estimated cost of handling each support ticket. A per-end-user fully loaded cost per hour may be equal to a total compensation (e.g., including pay and monetary value of benefits) to be provided to a plurality of end users for working over a period of time divided by a cumulative number of hours worked by the plurality of end users over the period of time. Translating the impact into the end user time disruption may involve determining which portions of the operations that are performed to implement the configuration change(s) occurred when the end users were using their devices and which portions of the operations occurred when the end users were not using their devices. For instance, an update installed overnight may have no impact on the end users, but an update installed during working hours may delay productivity of the end users by 10 minutes or more.

The admin portal 244 is an interface via which administrators in the customer environments may communicate with the result estimation logic 212. The admin portal 244 is configured to provide the result estimates 234A-234M to the respective customer environments 214A-214M.

Each of the customer environments 214A-214M includes an admin system and desktop clients. For instance, the customer environment 214A is shown to include admin system 204 and desktop clients 206A-206C. The admin system 204 is operable in a manner similar to any one of the admin systems 104A-104M described above with reference to FIG. 1. The desktop clients 206A-206C are operable in a manner similar to any of the user devices 106A-106M described above with reference to FIG. 1. The desktop client 206 is shown to include event logs 226, a registry 228, extensions 230, and a performance monitor agent 232 for non-limiting, illustrative purposes. The event logs 226 include information regarding the events that occur with regard to the desktop client 206A. For instance, the event logs 226 may include a time stamp to indicate a time instance at which a corresponding event occurred and descriptive information to describe the event. The registry 228 may include a database of configuration settings in an operating system (OS) of the desktop client 206A. The extensions 230 extend an operating system driver model. For instance, the extensions 230 may provide an OS interface through which instrumented components may provide information and notification. The performance monitor agent 232 reviews the event logs 226, the configuration settings in the registry 228, and the information and notifications that are received through the OS interface provided by the extensions 230 and generates the performance information 242 based thereon.

It will be recognized that the result estimation system 200 may not include one or more of the components shown in FIG. 2. Furthermore, the result estimation system 200 may include components in addition to or in lieu of the components shown in FIG. 2.

Figure 3:
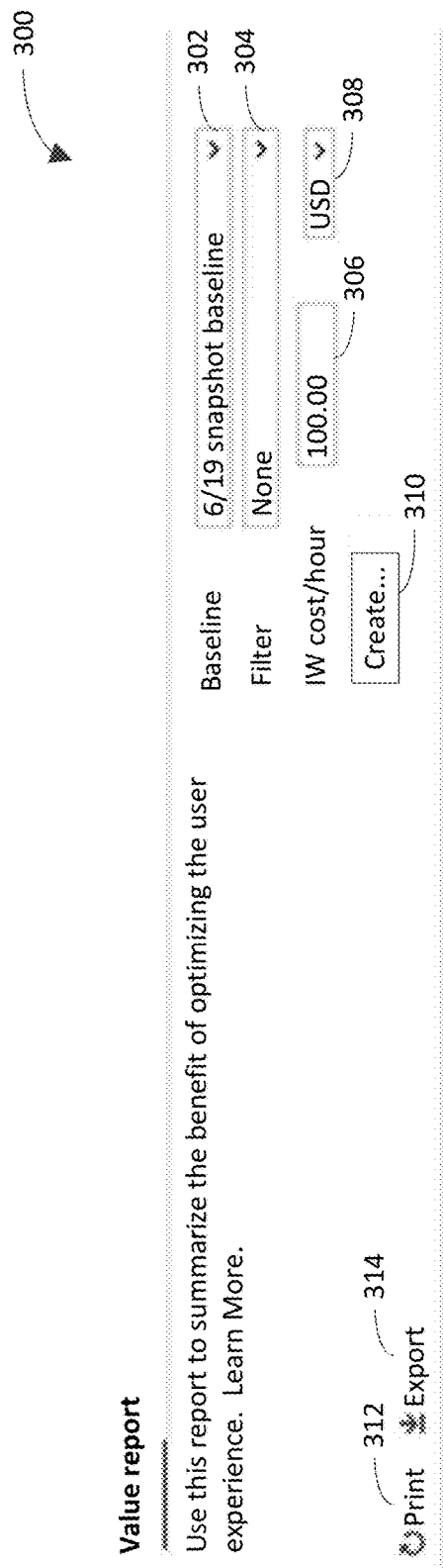
FIG. 3 illustrates an example value report in accordance with an embodiment.

FIG. 3 illustrates an example value report 300 in accordance with an embodiment. The value report 300 indicates an amount of money saved (or that could be saved) by an organization by making optimizations to performance metrics (e.g., boot time and login time) versus a previously measured baseline. The value report 300 includes a baseline menu 302, a filter menu 304, a cost-per-hour field 306, a currency menu 308, and a virtual create button 310. The baseline menu 302 enables an administrator of an enterprise to select a date on which a snapshot of metrics associated with the enterprise are captured to establish a baseline regarding the enterprise. The baseline menu 302 is configured to provide a plurality of dates from which the date is selected. The date is specified to be June $19^{th}$ for non-limiting, illustrative purposes. The filter menu 304 enables the administrator to filter events that occur in the enterprise for purposes of determining a net financial result of implementing configuration change(s) in the enterprise. The administrator has selected no filter for non-limiting, illustrative purposes. The cost-per-hour field 306 enables the administrator to specify a cost-per-hour to be associated with each information worker (IW). The currency menu 308 enables the administrator to specify the currency associated with the cost-per-hour specified in the cost-per-hour field 306. The administrator has specified a cost-per-hour of 100.00 in the cost-per-hour field 306 and selected U.S. dollars (USD) in the currency menu 308 for non-limiting, illustrative purposes. The virtual create button 310 enables the administrator to initiate creation of the net financial result of implementing the configuration changes in the enterprise.

The value report 300 shows the result of the administrator selecting the virtual create button 310. In particular, the value report 300 specifies that implementation of the configuration change(s) will result in a monthly savings of $28,000, which includes a first portion associated with a reduction of boot time that results from implementation of the configuration change(s) and a second portion associated with a reduction in login time that results from implementation of the configuration change(s). The value report 300 indicates that the implementation of the configuration change(s) reduces the boot time by 21 hours, which corresponds to a monthly cost savings of $10,238. The monthly cost savings attributable to the reduction of the boot time is based on analysis of 38,700 reboots corresponding to 17,234 devices for the month. The value report 300 further indicates that the implementation of the configuration change(s) reduces the login time by 38 hours, which corresponds to a monthly cost savings of $17,762. The monthly cost savings attributable to the reduction of the login time is based on analysis of 38,700 logins corresponding to 17,234 devices for the month. The value report 300 further indicates that the implementation of the configuration change(s) remediated 154 issues, corresponding to 17,234 devices and five scripts. Selection of a "Print" user interface element by the administrator causes the value report 300 to be printed. Selection of an "Export" user interface element by the administrator causes the value report 300 to be exported (e.g., saved in a file at a location specified by the administrator). The administrator may share the value report 300 with the chief information officer (CIO) of the organization, for example, to demonstrate the net amount of money saved (or to be saved) by implementing the configuration change(s).

Figure 4:
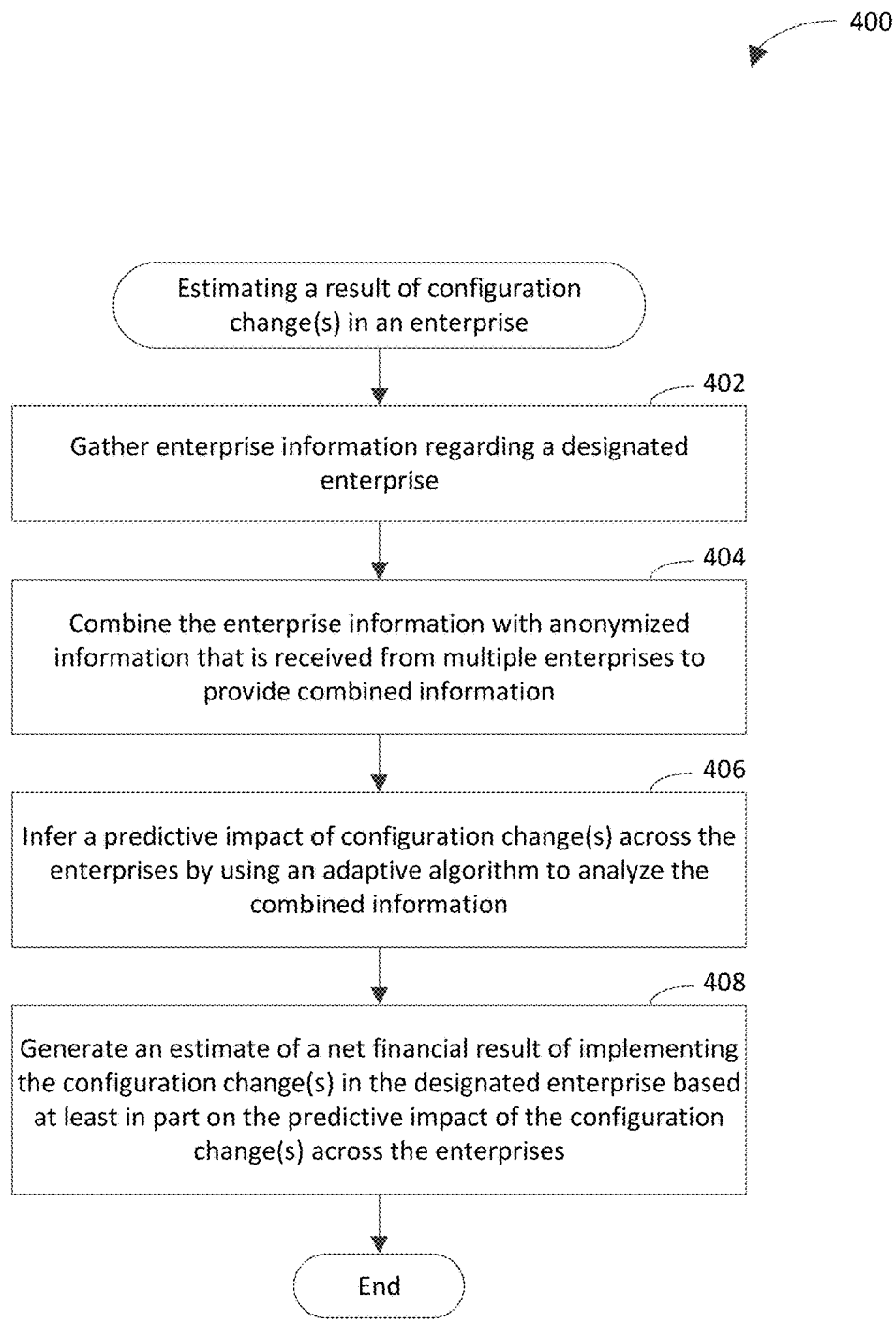
FIGS. 4-6 depict flowcharts of example methods for estimating a result of configuration change(s) in an enterprise in accordance with embodiments.
Figure 5:
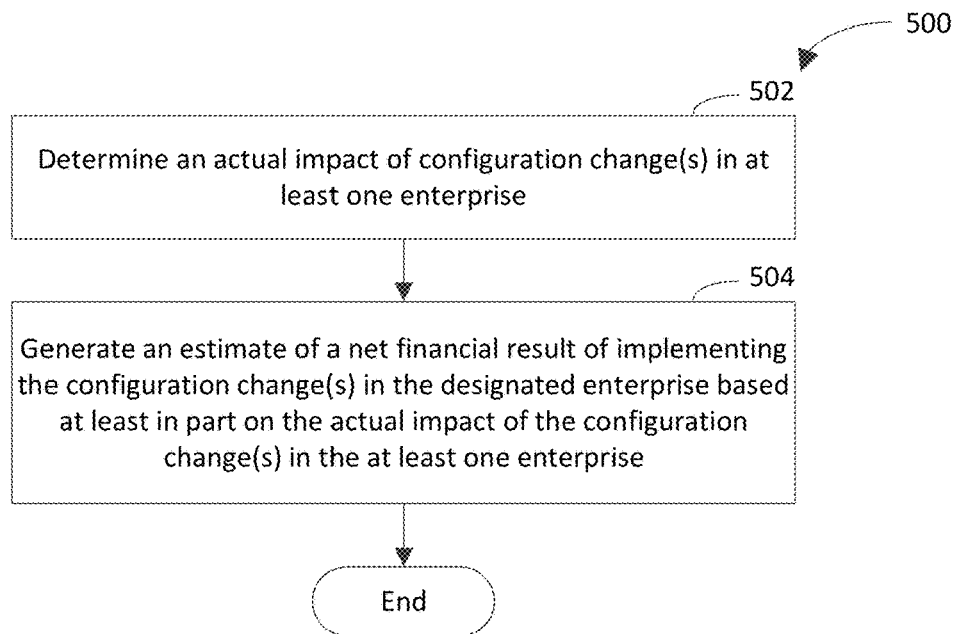
Figure 6:
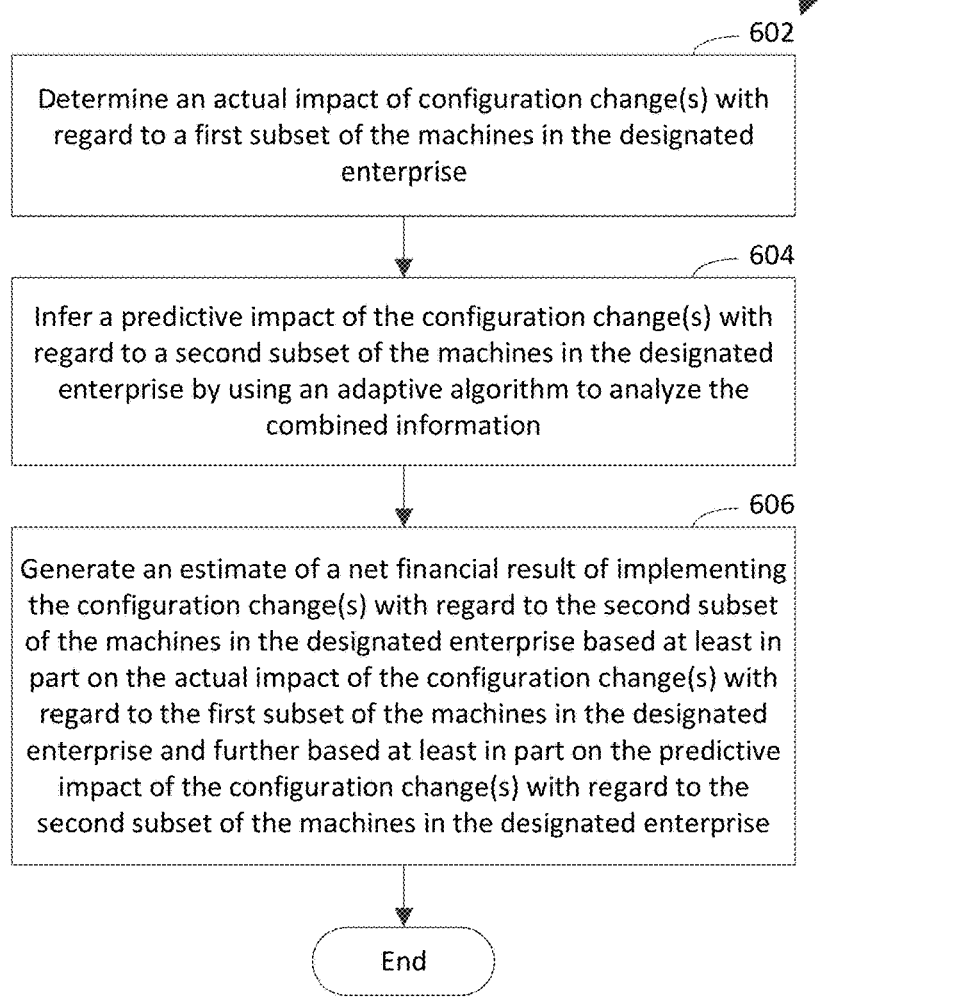
Figure 7:
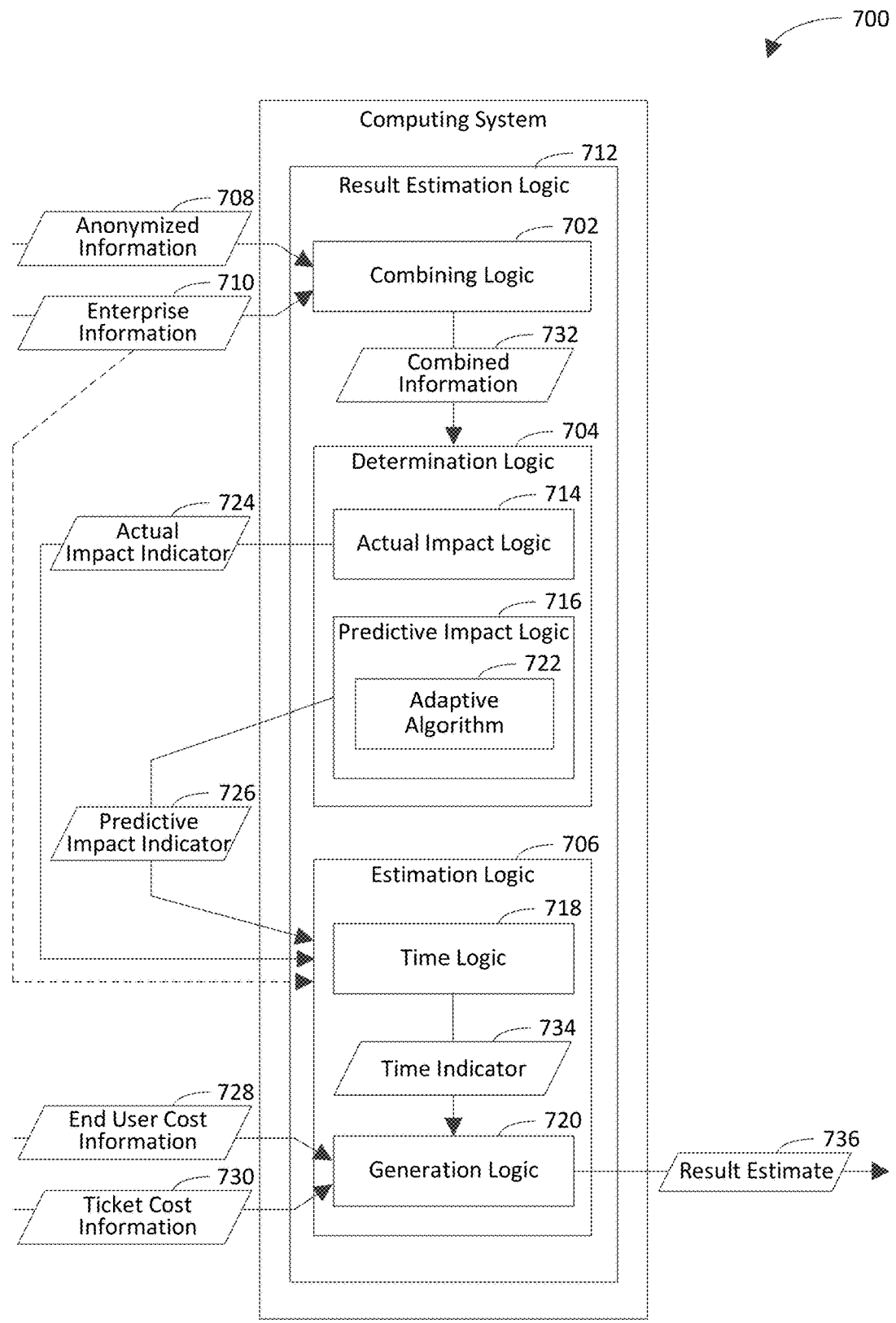
FIG. 7 is a block diagram of an example computing system in accordance with an embodiment.

FIGS. 4-6 depict flowcharts 400, 500, and 600 of example methods for estimating a result of configuration change(s) in an enterprise in accordance with embodiments. Flowcharts 400, 500, and 600 may be performed by the systems management server(s) 102, one of the admin systems 104A-104M, or a combination thereof, shown in FIG. 1, for example. For illustrative purposes, flowcharts 400, 500, and 600 are described with respect to computing system 700 shown in FIG. 7, which may be an example implementation of the systems management server(s) 102, one of the admin systems 104A-104M, or a combination thereof. As shown in FIG. 7, the computing system 700 includes result estimation logic 712. The result estimation logic 712 includes combining logic 702, determination logic 704, and estimation logic 706. The determination logic 704 includes actual impact logic 714 and predictive impact logic 716. The predictive impact logic 716 includes an adaptive algorithm 722. The estimation logic 706 includes time logic 718 and generation logic 720. Further structural and operational embodiments will be apparent to persons skilled in the relevant art(s) based on the discussion regarding flowcharts 400, 500, and 600.

As shown in FIG. 4, the method of flowchart 400 begins at step 402. In step 402, enterprise information regarding a designated enterprise is gathered. The enterprise information includes (a) configuration information indicating configuration changes that are made to a designated enterprise, (b) ticket information regarding a volume of support tickets that are received with regard to the configuration changes, and (c) performance information regarding performance of machines in the designated enterprise in response to the configuration changes. In an example implementation, combining logic 702 gathers enterprise information 710, which includes the configuration information, the ticket information, and the performance information.

The performance of any one or more machines may include machine boot time (e.g., by phase of a multi-phase implementation of the configuration change(s)); login time (e.g., by phase); application launch time(s) (e.g., a duration of time between a time instance at which an application launches and a time instance at which a user starts to interact with the application); total duration of CPU, memory, disk input/output (I/O), and/or network I/O consumption that is greater than or equal to a consumption threshold (e.g., 75% of total consumption capacity); machine utilization (e.g., number of hours that each machine is turned on and the user is interacting with the machine); application utilization; battery utilization; disk utilization; network latency and timeout rate (e.g., by application and/or uniform resource identifier (URI) end point; kernel crash (B SOD) mean-usage-time-between-failures; abnormal shutdowns mean-usage-time-between-failures; predictive battery life as mean-usage-time-between-drain; a subset of applications that, when a user interacts therewith, drain the battery at a rate that exceeds a threshold rate; predictive life of a hard drive; and/or frequency of crashes and hangs of drivers and/or applications.

The performance of any one or more machines may include an amount of downtime that the one or more machines experience due at least in part to the implementation of the configuration change(s). The downtime of a machine corresponds to downtime of the end user who uses the machine. The downtime of the end user corresponds to a reduction in productivity of the end user. The downtime of the machine may include time that the machine is off-line (e.g., not fully booted) and/or time during which the machine is in a state in which the end user is not able to interact with the machine. For instance, when an end user logs into a machine, the period of time between a time instance at which the end user enters the end user's credentials and a time instance at which the end user is able to start an application on the machine is an example of time during which the machine is in a state in which the end user is not able to interact with the machine.

At step 404, the enterprise information is combined with anonymized information that is received from multiple enterprises to provide combined information. The anonymized information includes (a) anonymized configuration information indicating configuration changes that are made to the enterprises, (b) anonymized ticket information regarding a volume of support tickets that are received with regard to the configuration changes that are made to the enterprises, and (c) anonymized performance information regarding performance of machines in the enterprises in response to the configuration changes being made to the enterprises. In an example implementation, the combining logic 702 combines the enterprise information 710 with anonymized information 708 that is received from the multiple enterprises to provide combined information 732.

At step 406, a predictive impact of configuration change(s) across the enterprises is inferred by using an adaptive algorithm to analyze the combined information. The predictive impact includes a predicted change to performance of machines in the enterprises as a result of the configuration change(s) and a predicted change to a volume of support tickets that are received in the enterprises as a result of the configuration change(s). For example, the predictive impact of the configuration change(s) across the enterprises may be inferred based at least in part on an actual impact of the configuration change(s) on one or more of the enterprises. In another example, the predictive impact of the configuration change(s) across the enterprises may be inferred based at least in part on an actual impact of one or more other configuration change on one or more of the enterprises. For instance, a correlation may be made between the one or more other configuration changes, the actual impact of the one or more other configuration changes, and the configuration change(s) to infer the predictive impact. In an example implementation, the predictive impact logic 716 infers the predictive impact of the configuration change(s) across the enterprises by using an adaptive algorithm 722 to analyze the combined information 732. In accordance with this implementation, the predictive impact logic 716 generates a predictive impact indicator 726 in response to inferring the predictive impact. The predictive impact indicator 726 indicates (e.g., specifies) the predictive impact.

In an example embodiment, inferring the predictive impact at step 406 is based at least in part on how the configuration change(s) are being implemented. For example, the determination may be based at least in part on an amount of time over which an implementation of the configuration change(s) is to be performed in the designated enterprise. In accordance with this example, implementing the configuration change(s) over a relatively short amount of time may have a greater impact than implementing the configuration change(s) over a relatively greater amount of time. For instance, pushing out an update rapidly may have, on average, a greater impact than pushing it out more gradually.

At step 408, an estimate of a net financial result of implementing the configuration change(s) in the designated enterprise is generated based at least in part on the predictive impact of the configuration change(s) across the enterprises. In an example implementation, the estimation logic 706 generates a result estimate 736 based at least in part on the predictive impact that is indicated by the predictive impact indicator 726. The result estimate 736 includes the estimate of the net financial result of implementing the configuration change(s) in the designated enterprise.

In an example embodiment, generating the estimate of the net financial result at step 408 includes determining a cumulative amount of time that productivity of end users in the designated enterprise is statistically likely to change as a result of the configuration change(s) based at least in part on the predictive impact. For example, the time logic 718 may determine the cumulative amount of time. In accordance with this example, the time logic 718 may generate a time indicator 734 to indicate the cumulative amount of time. In accordance with this embodiment, generating the estimate of the net financial result at step 408 is based at least in part on a sum of a first portion and a second portion. The first portion is equal to a product of the cumulative amount of time and a cost per unit of time per end user in the designated enterprise. The second portion is equal to an estimated cost of resolving support tickets regarding the configuration change(s) in the designated enterprise. For example, the generation logic 720 may generate the result estimate 736 based at least in part on the sum of the first portion and the second portion. In accordance with this example, the generation logic 720 may generate the result estimate 736 in response to receipt of the time indicator 734, end user cost information 728, and ticket cost information 730. The end user cost information 728 indicates the cost per unit of time per end user in the designated enterprise. The ticket cost information 730 indicates the estimated cost of resolving the support tickets regarding the configuration change(s) in the designated enterprise. In an aspect, the estimated cost of resolving the support tickets may be based at least in part on a predetermined fixed estimated cost that is associated with each support ticket. The fixed estimated cost may be any suitable cost, such as $100, $150, $185, etc. In accordance with this aspect, the estimated cost of resolving the support tickets regarding the configuration change(s) may be calculated by multiplying the fixed estimated cost and a number of the support tickets. For instance, if the fixed estimated cost is $100 and 23 support tickets are attributable to implementation of the configuration change(s), the estimated cost of resolving the support tickets is $100*23=$2300.

In an example implementation of this embodiment, the cumulative amount of time includes a first amount of time and a second amount of time. In accordance with this implementation, the first portion is equal to a sum of (a) a product of the first amount of time and a first common cost per unit of time per end user in a first subset of the end users in the designated enterprise and (b) a product of the second amount of time and a second common cost per unit of time per end user in a second subset of the end users in the designated enterprise. In further accordance with this implementation, the first common cost per unit of time per end user in the first subset of the end users and the second common cost per unit of time per end user in the second subset of the end users are different. Different common costs per unit of time per end user for respective subsets of the end users may be referred to as "differential labor costs". For example, the first subset of the end users may reside in a first geographic region, and the second subset of the end users may reside in a second geographic region that is different from the first geographic region. In accordance with this example, the first geographic region may be China, and the second geographic region may be Europe. In another example, the first subset of the end users may belong to a first hierarchical tier (e.g., pay grade) in a hierarchy of an organization, and the second subset of the end users may belong to a second hierarchical tier in the hierarchy, wherein the second hierarchical tier is different from the first hierarchical tier. In accordance with this example, the first hierarchical tier may correspond to administrative staff, and the second hierarchical tier may correspond to managers. It should be noted that if the product of the first amount of time and the first common cost per unit of time per end user in the first subset of the end users is greater than the product of the second amount of time and the second common cost per unit of time per end user in the second subset of the end users, a determination may be made to implement the configuration change(s) with regard to machines of the end users in the second subset before machines of the end users in the first subset, and vice versa.

In another example embodiment, generating the estimate of the net financial result at step 408 takes into consideration an estimated initial cost associated with implementing the configuration change(s) during implementation of the configuration change(s) and further takes into consideration an estimated financial benefit that is predicted to occur as a result of the implementation being completed. The estimated initial cost results from a predicted decrease in the performance of the machines in the designated enterprise and/or a predicted increase in the volume of the support tickets that are received with regard to the configuration change(s) in the designated enterprise during the implementation of the configuration change(s). The estimated financial benefit results from a predicted increase in the performance of the machines in the designated enterprise and/or a predicted decrease in the volume of the support tickets that are received in the designated enterprise after the implementation of the configuration change(s) is completed. For example, the estimated financial benefit may correspond to a payback period over which the estimated initial cost is offset by a reduction in the on-going cost associated with the machines after the implementation of the configuration change(s) is completed. In accordance with this example, on a day-to-day basis after the implementation of the configuration change(s) is completed, the end users may be more productive, fewer support tickets may be received, the machines of the end users may experience less downtime, the machines may be more efficient, the machines may perform operations faster, etc. If the estimated initial cost is greater than the estimated financial benefit that is predicted to occur, the net financial result may be referred to as a net financial loss. If the estimated initial cost is less than the estimated financial benefit that is predicted to occur, the net financial result may be referred to as a net financial gain.

In yet another example embodiment, the enterprise information further includes inventory information, which indicates hardware and/or software that is associated with the machines in the designated enterprise. In accordance with this embodiment, the anonymized information further includes anonymized inventory information, which indicates hardware and/or software that is associated with the machines in the plurality of enterprises. Inventory information (e.g., anonymized inventory information) may indicate any suitable information regarding any one or more machines. Examples of inventory information include but are not limited to a manufacturer and/or model of hardware associated with one or more machines; an age of such hardware; memory, central processing unit (CPU), hard drive, network, and/or attached peripheral(s) associated with one or more machines; a version and/or a patch level of an operating system (OS) that is deployed on one or more machines; applications installed on one or more machines; a boot configuration of one or more machines; a version of a basic input/output system (BIOS) that is deployed on one or more machines; an inventory and/or version(s) of driver(s) that are installed on one or more machines; and settings and/or policies associated with one or more machines.

In still another example embodiment, the performance information indicates an amount of time that end users of the machines in the designated enterprise are unable to interact with the machines in response to the configuration changes (e.g., in response to implementation of the configuration change(s) or as a result of the implementation of the configuration change(s)). For example, the end users may be unable to interact with the machines during downtime of the machines. In accordance with this example, the end users may be unable to interact with the machines during boot of the machines and/or during sign-in of the end users to the machines.

In another example embodiment, the performance information indicates that an end user switches from using a first machine to using a second machine as a result of the configuration changes being made to the designated enterprise. For instance, the end user may have a common end user identity across multiple machines of the end user. A cloud service (e.g., an agent thereof) or an application that is deployed on each of the end user's machines may detect when the user uses the that machine. For example, the cloud service or application may detect that the end user is actively using the cloud service to perform an operation (e.g., check the end user's email, reply to an email, interact with a social media account, etc.). Accordingly, a determination may be made that the end user switches from using the first machine to using the second machine based at least in part on a first signal from the cloud service or an application deployed on the first machine indicating that the end user is using the first machine at a first time instance prior to implementation of the configuration change(s) and a second signal from the cloud service or an application deployed on the second machine indicating that the end user is using the second machine at a second time instance after the implementation of the configuration change(s) is completed. In an example scenario, a determination may be made that although downtime of the end user's machine(s) has not changed, implementation of the configuration change(s) has caused the end user to switch from using the first machine to using the second machine. In accordance with this scenario, it may be known that the end user is X % less productive when using the second machine, as compared to using the first machine. Accordingly, the end user switching from using the first machine to using the second machine may indicate a relatively higher estimated initial cost of implementing the configuration change(s).

In yet another example embodiment, the performance information indicates an amount of time that an end user interacts (e.g., engages) with a specified application on one or more of the machines in the designated enterprise. For instance, the amount of time that the end user interacts with a machine may be detected by an application (e.g., a productivity application) that is deployed on the machine or a cloud service agent that is deployed on the machine. For example, the end user and/or an administrator of the designated enterprise may be presented with an option to opt-in to allowing the cloud service agent to monitor interactions of the end user with the machine. In accordance with this example, the cloud service agent may detect the amount of time that the end user interacts with the machine based at least in part on the end user and/or the administrator of the designated enterprise opting-in to allowing the cloud service agent to monitor the interactions of the end user with the machine.

In still another example embodiment, the performance information indicates productivity of an end user as determined by an application that is accessed by the end user on one or more of the machines in the designated enterprise.

In another example embodiment, the performance information indicates when end users interact with the machines in the designated enterprise. For instance, the performance information may indicate time(s) at which the end users interact with the machines, ranges of times over which the end users are statistically likely to interact with the machines, days of the week on which the end users interact with the machines, days of the week on which the end users are statistically likely to interact with the machines, and so on. For example, implementing configuration change(s) at night may have a substantially different impact on the end users and machines than implementing the configuration change(s) during the day. In another example, implementing configuration change(s) on the weekend may have a substantially different impact on the end users and machines than implementing the configuration change(s) during the work week. Accordingly, knowing when the end users interact with the machines may help to determine an impact that the implementation of the configuration change(s) may have on the end users and machines, which may lead to a more accurate estimate of the net financial result of implementing the configuration change(s) in the designated enterprise.

In some example embodiments, one or more steps 402, 404, 406, and/or 408 of flowchart 400 may not be performed. Moreover, steps in addition to or in lieu of steps 402, 404, 406, and/or 408 may be performed. For instance, in an example embodiment, the predictive impact of the configuration change(s) across the enterprises includes a predicted reduction of productivity of end users in the enterprises. In accordance with this embodiment, the method of flowchart 400 further includes providing a recommendation to modify at least one aspect of an implementation of the configuration change(s) in the designated enterprise to at least partially compensate for a predicted reduction of productivity of end users in the designated enterprise, which is based at least in part on the predicted reduction of productivity of the end users in the enterprises. For instance, providing the recommendation may include providing the recommendation to change a time and/or day on which to implement the configuration change(s) to at least partially compensate for the predicted reduction of productivity of the end users in the designated enterprise. For example, the recommendation may indicate that if a deadline for implementing the configuration change(s) is changed from Friday afternoon to Saturday afternoon, the estimated initial cost of implementing the configuration change(s) may be reduced by X % or $Y because more of the implementation can be performed during the off hours of the end users. In an example implementation, the estimation logic 706 provides the recommendation to modify at least one aspect of the implementation of the configuration change(s).

In another example embodiment, the method of flowchart 400 further includes determining an actual impact of the configuration change(s) in at least one enterprise. The actual impact may include an actual change to performance of one or more machines in the at least one enterprise and an actual change to a volume of support tickets that are received with regard to the configuration change(s) in the at least one enterprise. For instance, ticket information and performance information regarding the at least one enterprise prior to implementation of the configuration change(s) may be compared to may compare to ticket information and performance information regarding the at least one enterprise after the implementation of the configuration change(s) to determine the actual impact of the configuration change(s) in the at least one enterprise. The ticket information and performance information regarding the at least one enterprise may be anonymized, though the scope of the example embodiments is not limited in this respect. In an example implementation, the actual impact logic 714 determines the actual impact of the configuration change(s) in the at least one enterprise. For example, the actual impact logic 714 may generate an actual impact indicator 724 that indicates the actual impact of the configuration change(s) in the at least one enterprise. In accordance with this embodiment, generating the estimate of the net financial result at step 408 is based at least in part on the predictive impact of the configuration change(s) in the enterprises and further based at least in part on the actual impact of the configuration change(s) in the at least one enterprise. For instance, the estimation logic 706 may generate the result estimate 736 based at least in part on the predictive impact that is indicated by the predictive impact indicator 726 and further based at least in part on the actual impact that is indicated by the actual impact indicator 724. The result estimate 736 includes the estimate of the net financial result of implementing the configuration change(s) in the designated enterprise.

In yet another example embodiment, steps 406 and 408 of flowchart 400 may be replaced with one or more of the steps shown in flowchart 500 of FIG. 5. As shown in FIG. 5, the method of flowchart 500 begins at step 502. In step 502, an actual impact of configuration change(s) in at least one enterprise is determined. For instance, the actual impact may be determined based at least in part on the combined information. For example, the actual impact may be determined based at least in part on the enterprise information and/or the anonymized information. The actual impact includes an actual change to performance of machines in the at least one enterprise as a result of the configuration change(s) and an actual change to a volume of support tickets that are received with regard to the configuration change(s) in the at least one enterprise. In an example implementation, the actual impact logic 714 determines the actual impact of the configuration change(s) in the at least one enterprise. For instance, the actual impact logic 714 may determine the actual impact based at least in part on the combined information 732. In accordance with this implementation, the actual impact logic 714 generates an actual impact indicator 724 in response to determining the actual impact. The actual impact indicator 724 indicates (e.g., specifies) the actual impact.

At step 504, an estimate of a net financial result of implementing the configuration change(s) in the designated enterprise is generated based at least in part on the actual impact of the configuration change(s) in the at least one enterprise. In an example implementation, the estimation logic 706 generates a result estimate 736 based at least in part on the actual impact that is indicated by the actual impact indicator 724. The result estimate 736 includes the estimate of the net financial result of implementing the configuration change(s) in the designated enterprise.

Any of the embodiments described above with respect to steps 406 and/or 408 of flowchart 400 are also applicable to steps 502 and/or 504 of flowchart 500, though references to predictive impact and predicted change may be replaced with references to actual impact and actual change, respectively. For instance, in an example embodiment, generating the estimate of the net financial result at step 504 includes determining a cumulative amount of time that productivity of end users in the designated enterprise is statistically likely to change as a result of the configuration change(s) based at least in part on the actual impact. For example, the time logic 718 may determine the cumulative amount of time. In accordance with this example, the time logic 718 may generate a time indicator 734 to indicate the cumulative amount of time. In accordance with this embodiment, generating the estimate of the net financial result at step 504 is based at least in part on a sum of a first portion and a second portion. The first portion is equal to a product of the cumulative amount of time and a cost per unit of time per end user in the designated enterprise. The second portion is equal to an estimated cost of resolving support tickets regarding the configuration change(s) in the designated enterprise. For example, the generation logic 720 may generate the result estimate 736 based at least in part on the sum of the first portion and the second portion.

In an example implementation of this embodiment, the cumulative amount of time includes a first amount of time and a second amount of time. In accordance with this implementation, the first portion is equal to a sum of (a) a product of the first amount of time and a first common cost per unit of time per end user in a first subset of the end users in the designated enterprise and (b) a product of the second amount of time and a second common cost per unit of time per end user in a second subset of the end users in the designated enterprise. In further accordance with this implementation, the first common cost per unit of time per end user in the first subset of the end users and the second common cost per unit of time per end user in the second subset of the end users are different.

In another example embodiment, the actual impact of the configuration change(s) in the at least one enterprise includes an actual reduction of productivity of end users in the at least one enterprise. In accordance with this embodiment, the method of flowchart 500 further includes providing a recommendation to modify at least one aspect of an implementation of the configuration change(s) in the designated enterprise to at least partially compensate for a predicted reduction of productivity of the end users in the designated enterprise, which is based at least in part on the actual reduction of productivity of the end users in the at least one enterprise. For instance, providing the recommendation may include providing the recommendation to change a time and/or day on which to implement the configuration change(s) to at least partially compensate for a predicted reduction of productivity of end users in the designated enterprise that is based at least in part on the actual reduction of productivity of the end users in the at least one enterprise. In an example implementation, the estimation logic 706 provides the recommendation to modify at least one aspect of the implementation of the configuration change(s).

In yet another example embodiment, steps 406 and 408 of flowchart 400 may be replaced with one or more of the steps shown in flowchart 600 of FIG. 6. As shown in FIG. 6, the method of flowchart 600 begins at step 602. In step 602, an actual impact of configuration change(s) with regard to (e.g., on) a first subset of the machines in the designated enterprise is determined. The actual impact includes an actual change to performance of the first subset of the machines in the designated enterprise as a result of the configuration change(s) and an actual change to a volume of support tickets that are received in response to the configuration change(s) with regard to the first subset of the machines in the designated enterprise. In an example implementation, the actual impact logic 714 determines the actual impact of the configuration change(s) with regard to a first subset of the machines in the designated enterprise. For instance, the actual impact logic 714 may determine the actual impact based at least in part on the combined information 732. In accordance with this implementation, the actual impact logic 714 generates an actual impact indicator 724 in response to determining the actual impact. The actual impact indicator 724 indicates (e.g., specifies) the actual impact.

At step 604, a predictive impact of the configuration change(s) with regard to a second subset of the machines in the designated enterprise is inferred by using an adaptive algorithm to analyze the combined information. The predictive impact includes a predicted change to performance of the second subset of the machines in the designated enterprise as a result of the configuration change(s) and a predicted change to a volume of support tickets that are received in response to the configuration change(s) with regard to the second subset of the machines in the designated enterprise. The second subset of the machines is different from the first subset of the machines. In an example implementation, the predictive impact logic 716 infers the predictive impact of the configuration change(s) with regard to the second subset of the machines in the designated enterprise by using an adaptive algorithm 722 to analyze the combined information 732. In accordance with this implementation, the predictive impact logic 716 generates a predictive impact indicator 726 in response to inferring the predictive impact. The predictive impact indicator 726 indicates (e.g., specifies) the predictive impact.

It will be recognized that the actual impact of configuration change(s) may be determined at step 602 with regard to the first subset of the machines and not with regard to the second subset of the machines. It will be further recognized that the predictive impact of the configuration change(s) may be inferred at step 604 with regard to the second subset of the machines and not with regard to the first subset of the machines.

In an example embodiment, the implementation of the configuration change(s) with regard to the first subset of the machines is a pilot implementation of the configuration change(s). In accordance with this embodiment, the implementation of the configuration change(s) with regard to the second subset of the machines is a production implementation of the configuration change(s).

At step 606, an estimate of a net financial result of implementing the configuration change(s) with regard to the second subset of the machines in the designated enterprise is generated based at least in part on the actual impact of the configuration change(s) with regard to the first subset of the machines in the designated enterprise and further based at least in part on the predictive impact of the configuration change(s) with regard to the second subset of the machines in the designated enterprise. In an example implementation, the estimation logic 706 generates a result estimate 736 based at least in part on the actual impact that is indicated by the actual impact indicator 724 and further based at least in part on the predictive impact that is indicated by the predictive impact indicator 726. The result estimate 736 includes the estimate of the net financial result of implementing the configuration change(s) with regard to the second subset of the machines in the designated enterprise.

In an example embodiment, generating the estimate of the net financial result at step 606 includes determining a cumulative amount of time that productivity of end users of the second subset of the machines in the designated enterprise is statistically likely to change as a result of the configuration change(s) based at least in part on the actual impact and further based at least in part on the predictive impact. For example, the time logic 718 may determine the cumulative amount of time. In accordance with this example, the time logic 718 may generate a time indicator 734 to indicate the cumulative amount of time. In accordance with this embodiment, generating the estimate of the net financial result at step 606 is based at least in part on a sum of a first portion and a second portion. The first portion is equal to a product of the cumulative amount of time and a cost per unit of time per end user of a machine in the second subset of the machines in the designated enterprise. The second portion is equal to an estimated cost of resolving support tickets regarding the configuration change(s) with regard to the second subset of the machines in the designated enterprise. For example, the generation logic 720 may generate the result estimate 736 based at least in part on the sum of the first portion and the second portion. In accordance with this example, the generation logic 720 may generate the result estimate 736 in response to receipt of the time indicator 734, the end user cost information 728, and the ticket cost information 730. The end user cost information 728 indicates the cost per unit of time per end user of a machine in the second subset of the machines in the designated enterprise. The ticket cost information 730 indicates the estimated cost of resolving the support tickets regarding the configuration change(s) with regard to the second subset of the machines in the designated enterprise.

In an example implementation of this embodiment, the cumulative amount of time includes a first amount of time and a second amount of time. In accordance with this implementation, the first portion is equal to a sum of (a) a product of the first amount of time and a first common cost per unit of time per end user in a first subset of the end users of the machines in the second subset of the machines in the designated enterprise and (b) a product of the second amount of time and a second common cost per unit of time per end user in a second subset of the end users of the machines in the second subset of the machines in the designated enterprise. In further accordance with this implementation, the first common cost per unit of time per end user in the first subset of the end users and the second common cost per unit of time per end user in the second subset of the end users are different.

In another example embodiment, generating the estimate of the net financial result at step 606 takes into consideration an estimated initial cost associated with implementing the configuration change(s) during implementation of the configuration change(s) and further takes into consideration an estimated financial benefit that is predicted to occur as a result of the implementation being completed. The estimated initial cost results from a predicted decrease in the performance of the second subset of the machines in the designated enterprise and/or a predicted increase in the volume of the support tickets that are received with regard to the configuration change(s) with regard to the second subset of the machines in the designated enterprise during the implementation of the configuration change(s). The estimated financial benefit results from a predicted increase in the performance of the second subset of the machines in the designated enterprise and/or a predicted decrease in the volume of the support tickets that are received in the designated enterprise after the implementation of the configuration change(s) is completed.

In yet another example embodiment, the enterprise information further includes inventory information, which indicates hardware and/or software that is associated with the machines in the designated enterprise. In accordance with this embodiment, the anonymized information further includes anonymized inventory information, which indicates hardware and/or software that is associated with the machines in the plurality of enterprises.

In still another example embodiment, the performance information indicates an amount of time that end users of the machines in the designated enterprise are unable to interact with the machines in response to the configuration changes.

In another example embodiment, the performance information indicates that an end user switches from using a first machine to using a second machine as a result of the configuration changes being made to the designated enterprise.

In yet another example embodiment, the performance information indicates an amount of time that an end user interacts with a specified application on one or more of the machines in the designated enterprise.

In still another example embodiment, the performance information indicates productivity of an end user as determined by an application that is accessed by the end user on one or more of the machines in the designated enterprise.

In another example embodiment, the performance information indicates when end users interact with the machines in the designated enterprise.

In yet another example embodiment, the predictive impact of the configuration change(s) with regard to the second subset of the machines in the designated enterprise includes a predicted reduction of productivity of end users of the second subset of the machines in the designated enterprise. In accordance with this embodiment, the method of flowchart 600 further includes providing a recommendation to modify at least one aspect of an implementation of the configuration change(s) with regard to the second subset of the machines in the designated enterprise to at least partially compensate for the predicted reduction of productivity of the end users of the second subset of the machines in the designated enterprise. In an example implementation, the estimation logic 706 provides the recommendation to modify at least one aspect of the implementation of the configuration change(s).

Although the operations of some of the disclosed methods are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods may be used in conjunction with other methods.

It will be recognized that the computing system 700 may not include one or more of the combining logic 702, the determination logic 704, the estimation logic 706, the result estimation logic 712, the actual impact logic 714, the predictive impact logic 716, the adaptive algorithm 722, the time logic 718, and/or the generation logic 720. Furthermore, the computing system 700 may include components in addition to or in lieu of the combining logic 702, the determination logic 704, the estimation logic 706, the result estimation logic 712, the actual impact logic 714, the predictive impact logic 716, the adaptive algorithm 722, the time logic 718, and/or the generation logic 720.

Any one or more of the result estimation logic 112, the result estimation logic 212, the estimation logic 218, the event processor 222, the event collector 224, the performance monitor agent 232, the admin portal 244, the combining logic 702, the determination logic 704, the estimation logic 706, the result estimation logic 712, the actual impact logic 714, the predictive impact logic 716, the adaptive algorithm 722, the time logic 718, the generation logic 720, flowchart 400, flowchart 500, and/or flowchart 600 may be implemented in hardware, software, firmware, or any combination thereof.

For example, any one or more of the result estimation logic 112, the result estimation logic 212, the estimation logic 218, the event processor 222, the event collector 224, the performance monitor agent 232, the admin portal 244, the combining logic 702, the determination logic 704, the estimation logic 706, the result estimation logic 712, the actual impact logic 714, the predictive impact logic 716, the adaptive algorithm 722, the time logic 718, the generation logic 720, flowchart 400, flowchart 500, and/or flowchart 600 may be implemented, at least in part, as computer program code configured to be executed in one or more processors.

In another example, any one or more of the result estimation logic 112, the result estimation logic 212, the estimation logic 218, the event processor 222, the event collector 224, the performance monitor agent 232, the admin portal 244, the combining logic 702, the determination logic 704, the estimation logic 706, the result estimation logic 712, the actual impact logic 714, the predictive impact logic 716, the adaptive algorithm 722, the time logic 718, the generation logic 720, flowchart 400, flowchart 500, and/or flowchart 600 may be implemented, at least in part, as hardware logic/electrical circuitry. Such hardware logic/electrical circuitry may include one or more hardware logic components. Examples of a hardware logic component include but are not limited to a field-programmable gate array (FPGA), an application-specific integrated circuit (ASIC), an application-specific standard product (ASSP), a system-on-a-chip system (SoC), a complex programmable logic device (CPLD), etc. For instance, a SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

III. Further Discussion of Some Example Embodiments

An example system comprises a memory and one or more processors coupled to the memory. The one or more processors are configured to gather enterprise information, which includes (a) configuration information indicating configuration changes that are made to a designated enterprise, (b) ticket information regarding a volume of support tickets that are received with regard to the configuration changes, and (c) performance information regarding performance of machines in the designated enterprise in response to the configuration changes. The enterprise information is combined with anonymized information that is received from a plurality of enterprises to provide combined information. The anonymized information includes (a) anonymized configuration information indicating configuration changes that are made to the plurality of enterprises, (b) anonymized ticket information regarding a volume of support tickets that are received with regard to the configuration changes that are made to the plurality of enterprises, and (c) anonymized performance information regarding performance of machines in the plurality of enterprises in response to the configuration changes being made to the plurality of enterprises. A predictive impact of one or more configuration changes across the plurality of enterprises is inferred by using an adaptive algorithm to analyze the combined information. The predictive impact includes a predicted change to performance of machines in the plurality of enterprises as a result of the one or more configuration changes and a predicted change to a volume of support tickets that are received in the plurality of enterprises as a result of the one or more configuration changes. An estimate of a net financial result of implementing the one or more configuration changes in the designated enterprise is generated based at least in part on the predictive impact of the one or more configuration changes across the plurality of enterprises.

In a first aspect of the example system, the one or more processors are configured to determine a cumulative amount of time that productivity of end users in the designated enterprise is statistically likely to change as a result of the one or more configuration changes based at least in part on the predictive impact. In accordance with the first aspect, the estimate of the net financial result of implementing the one or more configuration changes in the designated enterprise is generated based at least in part on a sum of a first portion and a second portion. The first portion is equal to a product of the cumulative amount of time and a cost per unit of time per end user in the designated enterprise. The second portion is equal to an estimated cost of resolving support tickets regarding the one or more configuration changes in the designated enterprise.

In an implementation of the first aspect of the example system, the cumulative amount of time includes a first amount of time and a second amount of time. In accordance with this implementation, the first portion is equal to a sum of (a) a product of the first amount of time and a first common cost per unit of time per end user in a first subset of the end users in the designated enterprise and (b) a product of the second amount of time and a second common cost per unit of time per end user in a second subset of the end users in the designated enterprise. In further accordance with this implementation, the first common cost per unit of time per end user in the first subset of the end users and the second common cost per unit of time per end user in the second subset of the end users are different.

In a second aspect of the example system, the one or more processors are configured to generate the estimate of the net financial result of implementing the one or more configuration changes in the designated enterprise by taking into consideration an estimated initial cost associated with implementing the one or more configuration changes during implementation of the one or more configuration changes and by taking into consideration an estimated financial benefit that is predicted to occur as a result of the implementation being completed. In accordance with the second aspect, the estimated initial cost is based at least in part on at least one of a predicted decrease in the performance of the machines in the designated enterprise or a predicted increase in the volume of the support tickets that are received with regard to the one or more configuration changes in the designated enterprise during the implementation of the one or more configuration changes. In further accordance with the second aspect, the estimated financial benefit is based at least in part on at least one of a predicted increase in the performance of the machines in the designated enterprise or a predicted decrease in the volume of the support tickets that are received in the designated enterprise after the implementation of the one or more configuration changes is completed. The second aspect of the example system may be implemented in combination with the first aspect of the example system, though the example embodiments are not limited in this respect.

In a third aspect of the example system, the enterprise information further includes inventory information, which indicates at least one of hardware or software that is associated with the machines in the designated enterprise. In accordance with the third aspect, the anonymized information further includes anonymized inventory information, which indicates at least one of hardware or software that is associated with the machines in the plurality of enterprises. The third aspect of the example system may be implemented in combination with the first and/or second aspect of the example system, though the example embodiments are not limited in this respect.

In a fourth aspect of the example system, the performance information indicates an amount of time that end users of the machines in the designated enterprise are unable to interact with the machines in response to the configuration changes. The fourth aspect of the example system may be implemented in combination with the first, second, and/or third aspect of the example system, though the example embodiments are not limited in this respect.

In a fifth aspect of the example system, the performance information indicates that an end user switches from using a first machine to using a second machine as a result of the configuration changes being made to the designated enterprise. The fifth aspect of the example system may be implemented in combination with the first, second, third, and/or fourth aspect of the example system, though the example embodiments are not limited in this respect.

In a sixth aspect of the example system, the performance information indicates an amount of time that an end user interacts with a specified application on one or more of the machines in the designated enterprise. The sixth aspect of the example system may be implemented in combination with the first, second, third, fourth, and/or fifth aspect of the example system, though the example embodiments are not limited in this respect.

In a seventh aspect of the example system, the performance information indicates productivity of an end user as determined by an application that is accessed by the end user on one or more of the machines in the designated enterprise. The seventh aspect of the example system may be implemented in combination with the first, second, third, fourth, fifth, and/or sixth aspect of the example system, though the example embodiments are not limited in this respect.

In an eighth aspect of the example system, the performance information indicates when end users interact with the machines in the designated enterprise. The eighth aspect of the example system may be implemented in combination with the first, second, third, fourth, fifth, sixth, and/or seventh aspect of the example system, though the example embodiments are not limited in this respect.

In a ninth aspect of the example system, the predictive impact of the one or more configuration changes across the plurality of enterprises includes a predicted reduction of productivity of end users in the plurality of enterprises. In accordance with the ninth aspect, the one or more processors are further configured to provide a recommendation to modify at least one aspect of an implementation of the one or more configuration changes in the designated enterprise to at least partially compensate for a predicted reduction of productivity of end users in the designated enterprise, which is based at least in part on the predicted reduction of productivity of the end users in the plurality of enterprises. The ninth aspect of the example system may be implemented in combination with the first, second, third, fourth, fifth, sixth, seventh, and/or eighth aspect of the example system, though the example embodiments are not limited in this respect.

In a tenth aspect of the example system, the one or more processors are configured to determine an actual impact of the one or more configuration changes in at least one enterprise. The actual impact includes an actual change to performance of one or more machines in the at least one enterprise and an actual change to a volume of support tickets that are received with regard to the one or more configuration changes in the at least one enterprise. In accordance with the tenth aspect, the estimate of the net financial result of implementing the one or more configuration changes in the designated enterprise is generated based at least in part on the predictive impact of the one or more configuration changes in the plurality of enterprises and further based at least in part on the actual impact of the one or more configuration changes in the at least one enterprise. The tenth aspect of the example system may be implemented in combination with the first, second, third, fourth, fifth, sixth, seventh, eighth, and/or ninth aspect of the example system, though the example embodiments are not limited in this respect.

In an eleventh aspect of the example system, the one or more processors are configured to infer the predictive impact based at least in part on an amount of time over which an implementation of the one or more configuration changes is to be performed in the designated enterprise. The eleventh aspect of the example system may be implemented in combination with the first, second, third, fourth, fifth, sixth, seventh, eighth, ninth, and/or tenth aspect of the example system, though the example embodiments are not limited in this respect.

In an example method, enterprise information, which includes (a) configuration information indicating configuration changes that are made to a designated enterprise, (b) ticket information regarding a volume of support tickets that are received with regard to the configuration changes, and (c) performance information regarding performance of machines in the designated enterprise in response to the configuration changes, is gathered. The enterprise information is combined with anonymized information that is received from a plurality of enterprises to provide combined information. The anonymized information includes (a) anonymized configuration information indicating configuration changes that are made to the plurality of enterprises, (b) anonymized ticket information regarding a volume of support tickets that are received with regard to the configuration changes that are made to the plurality of enterprises, and (c) anonymized performance information regarding performance of machines in the plurality of enterprises in response to the configuration changes being made to the plurality of enterprises. An actual impact of one or more configuration changes in at least one enterprise is determined based at least in part on the combined information. The actual impact includes an actual change to performance of machines in the at least one enterprise as a result of the one or more configuration changes and an actual change to a volume of support tickets that are received with regard to the one or more configuration changes in the at least one enterprise. An estimate of a net financial result of implementing the one or more configuration changes in the designated enterprise is generated based at least in part on the actual impact of the one or more configuration changes in the at least one enterprise.

In a first aspect of the example method, generating the estimate of the net financial result comprises determining a cumulative amount of time that productivity of end users in the designated enterprise is statistically likely to change as a result of the one or more configuration changes based at least in part on the actual impact. In accordance with the first aspect, generating the estimate of the net financial result comprises generating the estimate of the net financial result of implementing the one or more configuration changes in the designated enterprise based at least in part on a sum of a first portion and a second portion, the first portion being equal to a product of the cumulative amount of time and a cost per unit of time per end user in the designated enterprise. In further accordance with the first aspect, the second portion is equal to an estimated cost of resolving support tickets regarding the one or more configuration changes in the designated enterprise.

In an implementation of the first aspect of the example method, the cumulative amount of time includes a first amount of time and a second amount of time. In accordance with this implementation, the first portion is equal to a sum of (a) a product of the first amount of time and a first common cost per unit of time per end user in a first subset of the end users in the designated enterprise and (b) a product of the second amount of time and a second common cost per unit of time per end user in a second subset of the end users in the designated enterprise. In further accordance with this implementation, the first common cost per unit of time per end user in the first subset of the end users and the second common cost per unit of time per end user in the second subset of the end users are different.

In a second aspect of the example method, generating the estimate of the net financial result of implementing the one or more configuration changes in the designated enterprise takes into consideration an estimated initial cost associated with implementing the one or more configuration changes during implementation of the one or more configuration changes and further takes into consideration an estimated financial benefit that is predicted to occur as a result of the implementation being completed. In accordance with the second aspect, the estimated initial cost results from at least one of a predicted decrease in the performance of the machines in the designated enterprise or a predicted increase in the volume of the support tickets that are received with regard to the one or more configuration changes in the designated enterprise during the implementation of the one or more configuration changes. In further accordance with the second aspect, the estimated financial benefit results from at least one of a predicted increase in the performance of the machines in the designated enterprise or a predicted decrease in the volume of the support tickets that are received in the designated enterprise after the implementation of the one or more configuration changes is completed. The second aspect of the example method may be implemented in combination with the first aspect of the example method, though the example embodiments are not limited in this respect.

In a third aspect of the example method, the enterprise information further includes inventory information, which indicates at least one of hardware or software that is associated with the machines in the designated enterprise. In accordance with the third aspect, the anonymized information further includes anonymized inventory information, which indicates at least one of hardware or software that is associated with the machines in the plurality of enterprises. The third aspect of the example method may be implemented in combination with the first and/or second aspect of the example method, though the example embodiments are not limited in this respect.

In a fourth aspect of the example method, the performance information indicates an amount of time that end users of the machines in the designated enterprise are unable to interact with the machines in response to the configuration changes. The fourth aspect of the example method may be implemented in combination with the first, second, and/or third aspect of the example method, though the example embodiments are not limited in this respect.

In a fifth aspect of the example method, the performance information indicates that an end user switches from using a first machine to using a second machine as a result of the configuration changes being made to the designated enterprise. The fifth aspect of the example method may be implemented in combination with the first, second, third, and/or fourth aspect of the example method, though the example embodiments are not limited in this respect.

In a sixth aspect of the example method, the performance information indicates an amount of time that an end user interacts with a specified application on one or more of the machines in the designated enterprise. The sixth aspect of the example method may be implemented in combination with the first, second, third, fourth, and/or fifth aspect of the example method, though the example embodiments are not limited in this respect.

In a seventh aspect of the example method, the performance information indicates productivity of an end user as determined by an application that is accessed by the end user on one or more of the machines in the designated enterprise. The seventh aspect of the example method may be implemented in combination with the first, second, third, fourth, fifth, and/or sixth aspect of the example method, though the example embodiments are not limited in this respect.

In an eighth aspect of the example method, the performance information indicates when end users interact with the machines in the designated enterprise. The eighth aspect of the example method may be implemented in combination with the first, second, third, fourth, fifth, sixth, and/or seventh aspect of the example method, though the example embodiments are not limited in this respect.

In a ninth aspect of the example method, the actual impact of the one or more configuration changes in the at least one enterprise includes an actual reduction of productivity of end users in the at least one enterprise. In accordance with the ninth aspect, the example method further comprises providing a recommendation to modify at least one aspect of an implementation of the one or more configuration changes in the designated enterprise to at least partially compensate for a predicted reduction of productivity of the end users in the designated enterprise, which is based at least in part on the actual reduction of productivity of the end users in the at least one enterprise. The ninth aspect of the example method may be implemented in combination with the first, second, third, fourth, fifth, sixth, seventh, and/or eighth aspect of the example method, though the example embodiments are not limited in this respect.

An example computer program product comprises a computer-readable storage medium having instructions recorded thereon for enabling a processor-based system to perform operations. The operations comprise gather enterprise information, which includes (a) configuration information indicating configuration changes that are made to a designated enterprise, (b) ticket information regarding a volume of support tickets that are received with regard to the configuration changes, and (c) performance information regarding performance of machines in the designated enterprise in response to the configuration changes. The operations further comprise combine the enterprise information with anonymized information that is received from a plurality of enterprises to provide combined information. The anonymized information includes (a) anonymized configuration information indicating configuration changes that are made to the plurality of enterprises, (b) anonymized ticket information regarding a volume of support tickets that are received with regard to the configuration changes that are made to the plurality of enterprises, and (c) anonymized performance information regarding performance of machines in the plurality of enterprises in response to the configuration changes being made to the plurality of enterprises. The operations further comprise determine an actual impact of one or more configuration changes with regard to a first subset of the machines in the designated enterprise. The actual impact includes an actual change to performance of the first subset of the machines in the designated enterprise as a result of the one or more configuration changes and an actual change to a volume of support tickets that are received in response to the one or more configuration changes with regard to the first subset of the machines in the designated enterprise. The operations further comprise infer a predictive impact of the one or more configuration changes with regard to a second subset of the machines in the designated enterprise by using an adaptive algorithm to analyze the combined information. The predictive impact includes a predicted change to performance of the second subset of the machines in the designated enterprise as a result of the one or more configuration changes and a predicted change to a volume of support tickets that are received in response to the one or more configuration changes with regard to the second subset of the machines in the designated enterprise. The operations further comprise generate an estimate of a net financial result of implementing the one or more configuration changes with regard to the second subset of the machines in the designated enterprise based at least in part on the actual impact of the one or more configuration changes with regard to the first subset of the machines in the designated enterprise and further based at least in part on the predictive impact of the one or more configuration changes with regard to the second subset of the machines in the designated enterprise.

In a first aspect of the example computer program product, the operations comprise determine a cumulative amount of time that productivity of end users of the second subset of the machines in the designated enterprise is statistically likely to change as a result of the one or more configuration changes based at least in part on the actual impact and further based at least in part on the predictive impact. In accordance with the first aspect, the operations comprise generate the estimate of the net financial result of implementing the one or more configuration changes with regard to the second subset of the machines in the designated enterprise based at least in part on a sum of a first portion and a second portion. The first portion is equal to a product of the cumulative amount of time and a cost per unit of time per end user of a machine in the second subset of the machines in the designated enterprise. The second portion is equal to an estimated cost of resolving support tickets regarding the one or more configuration changes with regard to the second subset of the machines in the designated enterprise.

In an implementation of the first aspect of the example computer program product, the cumulative amount of time includes a first amount of time and a second amount of time. In accordance with this implementation, the first portion is equal to a sum of (a) a product of the first amount of time and a first common cost per unit of time per end user in a first subset of the end users of the machines in the second subset of the machines in the designated enterprise and (b) a product of the second amount of time and a second common cost per unit of time per end user in a second subset of the end users of the machines in the second subset of the machines in the designated enterprise. In further accordance with this implementation, the first common cost per unit of time per end user in the first subset of the end users and the second common cost per unit of time per end user in the second subset of the end users are different.

In a second aspect of the example computer program product, the operations comprise generate the estimate of the net financial result of implementing the one or more configuration changes with regard to the second subset of the machines in the designated enterprise by taking into consideration an estimated initial cost associated with implementing the one or more configuration changes during implementation of the one or more configuration changes and by taking into consideration an estimated financial benefit that is predicted to occur as a result of the implementation being completed. In accordance with the second aspect, the estimated initial cost is based at least in part on at least one of a predicted decrease in the performance of the second subset of the machines in the designated enterprise or a predicted increase in the volume of the support tickets that are received with regard to the one or more configuration changes with regard to the second subset of the machines in the designated enterprise during the implementation of the one or more configuration changes. In further accordance with the second aspect, the estimated financial benefit is based at least in part on at least one of a predicted increase in the performance of the second subset of the machines in the designated enterprise or a predicted decrease in the volume of the support tickets that are received in the designated enterprise after the implementation of the one or more configuration changes is completed. The second aspect of the example computer program product may be implemented in combination with the first aspect of the example computer program product, though the example embodiments are not limited in this respect.

IV. Example Computer System

Figure 8:
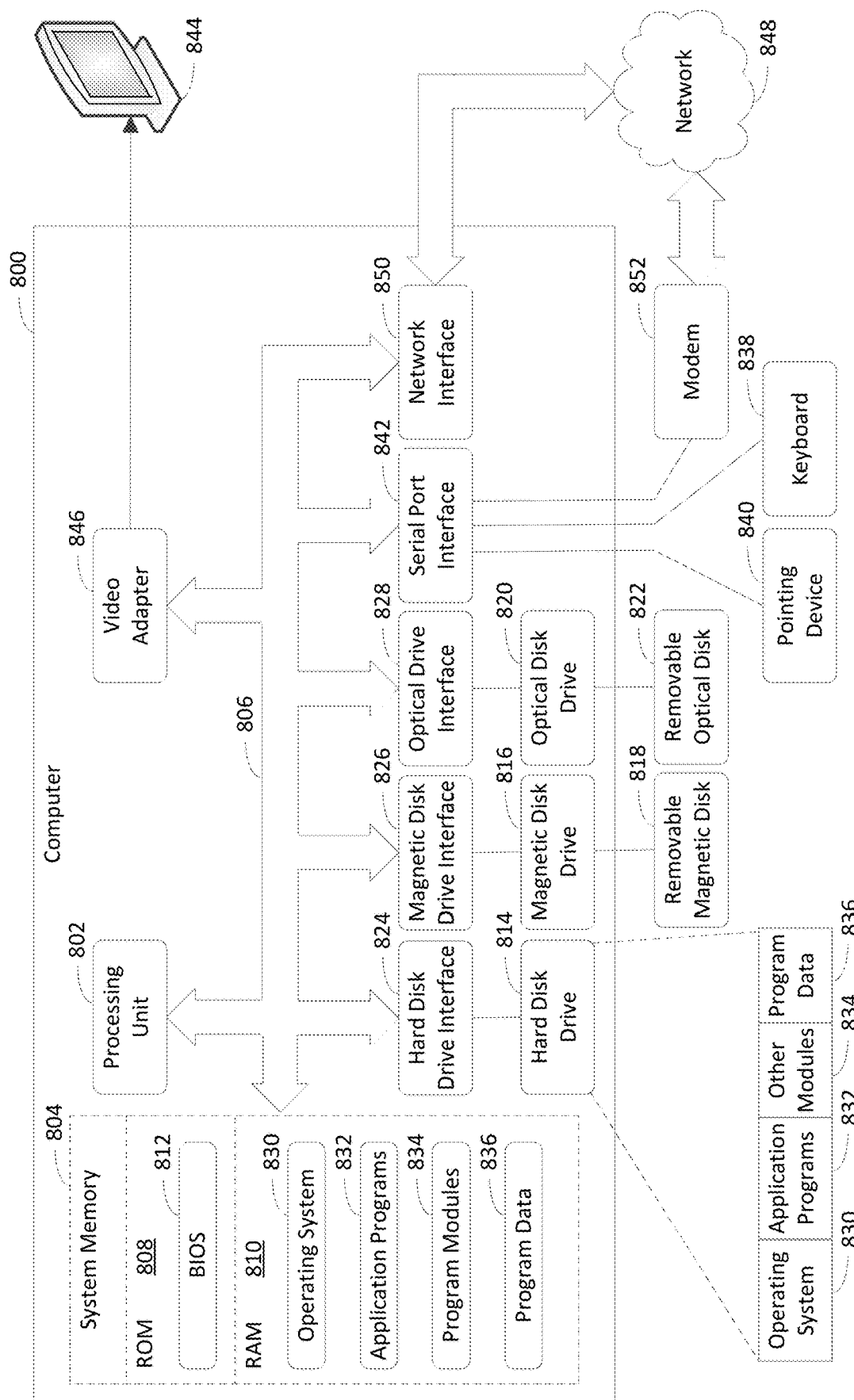
FIG. 8 depicts an example computer in which embodiments may be implemented.

FIG. 8 depicts an example computer 800 in which embodiments may be implemented. Any one or more of user devices 106A-106M, any one or more of admin systems 104A-104M, and/or any one or more of systems management server(s) 102 shown in FIG. 1; any one or more of systems management server(s) 202, admin system 204, and/or any one or more of desktop clients 206A-206C shown in FIG. 2; and/or computing system 700 shown in FIG. 7 may be implemented using computer 800, including one or more features of computer 800 and/or alternative features. Computer 800 may be a general-purpose computing device in the form of a conventional personal computer, a mobile computer, or a workstation, for example, or computer 800 may be a special purpose computing device. The description of computer 800 provided herein is provided for purposes of illustration, and is not intended to be limiting. Embodiments may be implemented in further types of computer systems, as would be known to persons skilled in the relevant art(s).

As shown in FIG. 8, computer 800 includes a processing unit 802, a system memory 804, and a bus 806 that couples various system components including system memory 804 to processing unit 802. Bus 806 represents one or more of any of several types of bus structures, including a memory bus or memory controller, a peripheral bus, an accelerated graphics port, and a processor or local bus using any of a variety of bus architectures. System memory 804 includes read only memory (ROM) 808 and random access memory (RAM) 810. A basic input/output system 812 (BIOS) is stored in ROM 808.

Computer 800 also has one or more of the following drives: a hard disk drive 814 for reading from and writing to a hard disk, a magnetic disk drive 816 for reading from or writing to a removable magnetic disk 818, and an optical disk drive 820 for reading from or writing to a removable optical disk 822 such as a CD ROM, DVD ROM, or other optical media. Hard disk drive 814, magnetic disk drive 816, and optical disk drive 820 are connected to bus 806 by a hard disk drive interface 824, a magnetic disk drive interface 826, and an optical drive interface 828, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 830, one or more application programs 832, other program modules 834, and program data 836. Application programs 832 or program modules 834 may include, for example, computer program logic for implementing any one or more of (e.g., at least a portion of) the result estimation logic 112, the result estimation logic 212, the estimation logic 218, the event processor 222, the event collector 224, the performance monitor agent 232, the admin portal 244, the combining logic 702, the determination logic 704, the estimation logic 706, the result estimation logic 712, the actual impact logic 714, the predictive impact logic 716, the adaptive algorithm 722, the time logic 718, the generation logic 720, flowchart 400 (including any step of flowchart 400), flowchart 500 (including any step of flowchart 500), and/or flowchart 600 (including any step of flowchart 600), as described herein.

A user may enter commands and information into the computer 800 through input devices such as keyboard 838 and pointing device 840. Other input devices (not shown) may include a microphone, joystick, game pad, satellite dish, scanner, touch screen, camera, accelerometer, gyroscope, or the like. These and other input devices are often connected to the processing unit 802 through a serial port interface 842 that is coupled to bus 806, but may be connected by other interfaces, such as a parallel port, game port, or a universal serial bus (USB).

A display device 844 (e.g., a monitor) is also connected to bus 806 via an interface, such as a video adapter 846. In addition to display device 844, computer 800 may include other peripheral output devices (not shown) such as speakers and printers.

Computer 800 is connected to a network 848 (e.g., the Internet) through a network interface or adapter 850, a modem 852, or other means for establishing communications over the network. Modem 852, which may be internal or external, is connected to bus 806 via serial port interface 842.

As used herein, the terms "computer program medium" and "computer-readable storage medium" are used to generally refer to media (e.g., non-transitory media) such as the hard disk associated with hard disk drive 814, removable magnetic disk 818, removable optical disk 822, as well as other media such as flash memory cards, digital video disks, random access memories (RAMs), read only memories (ROM), and the like. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Example embodiments are also directed to such communication media.

As noted above, computer programs and modules (including application programs 832 and other program modules 834) may be stored on the hard disk, magnetic disk, optical disk, ROM, or RAM. Such computer programs may also be received via network interface 850 or serial port interface 842. Such computer programs, when executed or loaded by an application, enable computer 800 to implement features of embodiments discussed herein. Accordingly, such computer programs represent controllers of the computer 800.

Example embodiments are also directed to computer program products comprising software (e.g., computer-readable instructions) stored on any computer-useable medium. Such software, when executed in one or more data processing devices, causes data processing device(s) to operate as described herein. Embodiments may employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

It will be recognized that the disclosed technologies are not limited to any particular computer or type of hardware. Certain details of suitable computers and hardware are well known and need not be set forth in detail in this disclosure.

V. Conclusion

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

What is claimed is:

1. A system comprising:
   memory; and
   one or more processors coupled to the memory, the one or more processors configured to:
   gather enterprise information, which includes:
      configuration information indicating first configuration changes that are associated with first machines in a designated enterprise,
      ticket information regarding a volume of support tickets that are received with regard to the first configuration changes that are associated with the first machines in the designated enterprise, and
      performance information regarding performance of the first machines in the designated enterprise in response to the first configuration changes that are associated with the first machines in the designated enterprise;
   combine the enterprise information with anonymized information that is received from a plurality of enterprises to provide combined information, the anonymized information including:

anonymized configuration information indicating second configuration changes that are associated with second machines in the plurality of enterprises, anonymized ticket information regarding a volume of support tickets that are received with regard to the second configuration changes that are associated with the second machines in the plurality of enterprises, and anonymized performance information regarding performance of the second machines in the plurality of enterprises in response to the second configuration changes that are associated with the second machines in the plurality of enterprises;

infer a predictive impact of one or more third configuration changes across the plurality of enterprises by using an adaptive algorithm to analyze the combined information, the predictive impact including:

a predicted change to performance of the second machines in the plurality of enterprises as a result of the one or more third configuration changes, and a predicted change to a volume of support tickets that are received in the plurality of enterprises as a result of the one or more third configuration changes;

generate an estimate of a net financial result of implementing the one or more third configuration changes in the designated enterprise based at least in part on the predictive impact of the one or more third configuration changes across the plurality of enterprises; and based on the generated estimate of the net financial result, increase efficiency of a computing system, which is configured to perform systems management operations for the designated enterprise that includes the first machines, by causing the computing system to modify at least one third configuration change of the one or more third configuration changes for implementation in the designated enterprise, wherein the at least one third configuration change includes at least one of:

deployment of software on at least one of the first machines in the designated enterprise, changing hardware on at least one of the first machines in the designated enterprise, changing one or more security settings associated with at least one of the first machines in the designated enterprise, or changing one or more compliance settings associated with at least one of the first machines in the designated enterprise.

2. The system of claim 1, wherein the one or more processors are configured to:

determine a cumulative amount of time that productivity of end users in the designated enterprise is statistically likely to change as a result of the one or more third configuration changes based at least in part on the predictive impact; and generate the estimate of the net financial result of implementing the one or more third configuration changes in the designated enterprise based at least in part on a sum of a first portion and a second portion, the first portion being equal to a product of the cumulative amount of time and a cost per unit of time per end user in the designated enterprise, the second portion being equal to an estimated cost of resolving support tickets regarding the one or more third configuration changes in the designated enterprise.

3. The system of claim 2, wherein the cumulative amount of time includes a first amount of time and a second amount of time;

wherein the first portion is equal to a sum of (a) a product of the first amount of time and a first common cost per unit of time per end user in a first subset of the end users in the designated enterprise and (b) a product of the second amount of time and a second common cost per unit of time per end user in a second subset of the end users in the designated enterprise; and wherein the first common cost per unit of time per end user in the first subset of the end users and the second common cost per unit of time per end user in the second subset of the end users are different.

4. The system of claim 1, wherein the one or more processors are configured to:

generate the estimate of the net financial result of implementing the one or more third configuration changes in the designated enterprise by taking into consideration an estimated initial cost associated with implementing the one or more third configuration changes during implementation of the one or more third configuration changes and by taking into consideration an estimated financial benefit that is predicted to occur as a result of the implementation being completed;

wherein the estimated initial cost is based at least in part on at least one of a predicted decrease in the performance of the first machines in the designated enterprise or a predicted increase in the volume of the support tickets that are received with regard to the one or more third configuration changes in the designated enterprise during the implementation of the one or more third configuration changes; and wherein the estimated financial benefit is based at least in part on at least one of a predicted increase in the performance of the first machines in the designated enterprise or a predicted decrease in the volume of the support tickets that are received in the designated enterprise after the implementation of the one or more third configuration changes is completed.

5. The system of claim 1, wherein the enterprise information further includes inventory information, which indicates at least one of hardware or software that is associated with the first machines in the designated enterprise; and wherein the anonymized information further includes anonymized inventory information, which indicates at least one of hardware or software that is associated with the second machines in the plurality of enterprises.

6. The system of claim 1, wherein the performance information indicates at least one of the following:

an amount of time that end users of the first machines in the designated enterprise are unable to interact with the first machines in response to the first configuration changes;

that an end user switches from using an initial machine to using a subsequent machine as a result of the first configuration changes being made to the designated enterprise;

an amount of time that an end user interacts with a specified application on one or more of the first machines in the designated enterprise;

productivity of an end user as determined by an application that is accessed by the end user on one or more of the first machines in the designated enterprise; or when end users interact with the first machines in the designated enterprise.

7. The system of claim 1, wherein the predictive impact of the one or more third configuration changes across the plurality of enterprises includes a predicted reduction of productivity of end users in the plurality of enterprises; and
wherein the one or more processors are further configured to:
provide a recommendation to modify at least one aspect of an implementation of the one or more third configuration changes in the designated enterprise to at least partially compensate for a predicted reduction of productivity of end users in the designated enterprise, which is based at least in part on the predicted reduction of productivity of the end users in the plurality of enterprises.

8. The system of claim 1, wherein the one or more processors are configured to:
determine an actual impact of the one or more third configuration changes in at least one enterprise, the actual impact including an actual change to performance of one or more third machines in the at least one enterprise and an actual change to a volume of support tickets that are received with regard to the one or more third configuration changes in the at least one enterprise; and
generate the estimate of the net financial result of implementing the one or more third configuration changes in the designated enterprise based at least in part on the predictive impact of the one or more third configuration changes in the plurality of enterprises and further based at least in part on the actual impact of the one or more third configuration changes in the at least one enterprise.

9. The system of claim 1, wherein the one or more processors are configured to:
infer the predictive impact based at least in part on an amount of time over which an implementation of the one or more third configuration changes is to be performed in the designated enterprise.

10. A method, which is implemented by a computing system, comprising:
gathering enterprise information, which includes:
configuration information indicating first configuration changes that are associated with first machines in a designated enterprise,
ticket information regarding a volume of support tickets that are received with regard to the first configuration changes that are associated with the first machines in the designated enterprise, and
performance information regarding performance of the first machines in the designated enterprise in response to the first configuration changes that are associated with the first machines in the designated enterprise;
combining the enterprise information with anonymized information that is received from a plurality of enterprises to provide combined information, the anonymized information including:
anonymized configuration information indicating second configuration changes that are associated with second machines in the plurality of enterprises,
anonymized ticket information regarding a volume of support tickets that are received with regard to the second configuration changes that are associated with the second machines in the plurality of enterprises, and
anonymized performance information regarding performance of the second machines in the plurality of enterprises in response to the second configuration changes that are associated with the second machines in the plurality of enterprises;
determining an actual impact of one or more third configuration changes in at least one enterprise based at least in part on the combined information, the actual impact including:
an actual change to performance of third machines in the at least one enterprise as a result of the one or more third configuration changes, and
an actual change to a volume of support tickets that are received with regard to the one or more third configuration changes in the at least one enterprise;
generating an estimate of a net financial result of implementing the one or more third configuration changes in the designated enterprise based at least in part on the actual impact of the one or more third configuration changes in the at least one enterprise; and
based on the generated estimate of the net financial result, increasing efficiency of a processor-based system, which is configured to perform systems management operations for the designated enterprise that includes the first machines, by causing the processor-based system to modify at least one third configuration change of the one or more third configuration changes for implementation in the designated enterprise, wherein the at least one third configuration change includes at least one of:
deploying software on at least one of the first machines in the designated enterprise,
changing hardware on at least one of the first machines in the designated enterprise,
changing one or more security settings associated with at least one of the first machines in the designated enterprise, or
changing one or more compliance settings associated with at least one of the first machines in the designated enterprise.

11. The method of claim 10, wherein generating the estimate of the net financial result comprises:
determining a cumulative amount of time that productivity of end users in the designated enterprise is statistically likely to change as a result of the one or more third configuration changes based at least in part on the actual impact; and
generating the estimate of the net financial result of implementing the one or more third configuration changes in the designated enterprise based at least in part on a sum of a first portion and a second portion, the first portion being equal to a product of the cumulative amount of time and a cost per unit of time per end user in the designated enterprise, the second portion being equal to an estimated cost of resolving support tickets regarding the one or more third configuration changes in the designated enterprise.

12. The method of claim 11, wherein the cumulative amount of time includes a first amount of time and a second amount of time;
wherein the first portion is equal to a sum of (a) a product of the first amount of time and a first common cost per unit of time per end user in a first subset of the end users in the designated enterprise and (b) a product of the second amount of time and a second common cost per unit of time per end user in a second subset of the end users in the designated enterprise; and wherein the first common cost per unit of time per end user in the first subset of the end users and the second common cost per unit of time per end user in the second subset of the end users are different.

13. The method of claim 10, wherein generating the estimate of the net financial result of implementing the one or more third configuration changes in the designated enterprise takes into consideration an estimated initial cost associated with implementing the one or more third configuration changes during implementation of the one or more third configuration changes and further takes into consideration an estimated financial benefit that is predicted to occur as a result of the implementation being completed;
  wherein the estimated initial cost results from at least one of a predicted decrease in the performance of the first machines in the designated enterprise or a predicted increase in the volume of the support tickets that are received with regard to the one or more third configuration changes in the designated enterprise during the implementation of the one or more third configuration changes; and
  wherein the estimated financial benefit results from at least one of a predicted increase in the performance of the first machines in the designated enterprise or a predicted decrease in the volume of the support tickets that are received in the designated enterprise after the implementation of the one or more third configuration changes is completed.

14. The method of claim 10, wherein the enterprise information further includes inventory information, which indicates at least one of hardware or software that is associated with the first machines in the designated enterprise; and
  wherein the anonymized information further includes anonymized inventory information, which indicates at least one of hardware or software that is associated with the second machines in the plurality of enterprises.

15. The method of claim 10, wherein the performance information indicates at least one of the following:
  an amount of time that end users of the first machines in the designated enterprise are unable to interact with the first machines in response to the first configuration changes;
  that an end user switches from using an initial machine to using a subsequent machine as a result of the first configuration changes being made to the designated enterprise;
  an amount of time that an end user interacts with a specified application on one or more of the first machines in the designated enterprise;
  productivity of an end user as determined by an application that is accessed by the end user on one or more of the first machines in the designated enterprise; or
  when end users interact with the first machines in the designated enterprise.

16. The method of claim 10, wherein the actual impact of the one or more third configuration changes in the at least one enterprise includes an actual reduction of productivity of end users in the at least one enterprise; and
  wherein the method further comprises:
    providing a recommendation to modify at least one aspect of an implementation of the one or more third configuration changes in the designated enterprise to at least partially compensate for a predicted reduction of productivity of the end users in the designated enterprise, which is based at least in part on the actual reduction of productivity of the end users in the at least one enterprise.

17. A computer program product comprising a computer-readable storage medium having instructions recorded thereon for enabling a processor-based system to perform operations, the operations comprising:
  gather enterprise information, which includes:
    configuration information indicating first configuration changes that are associated with first machines in a designated enterprise,
    ticket information regarding a volume of support tickets that are received with regard to the first configuration changes that are associated with the first machines in the designated enterprise, and
    performance information regarding performance of the first machines in the designated enterprise in response to the first configuration changes that are associated with the first machines in the designated enterprise;
  combine the enterprise information with anonymized information that is received from a plurality of enterprises to provide combined information, the anonymized information including:
    anonymized configuration information indicating second configuration changes that are associated with second machines in the plurality of enterprises,
    anonymized ticket information regarding a volume of support tickets that are received with regard to the second configuration changes that are associated with the second machines in the plurality of enterprises, and
    anonymized performance information regarding performance of the second machines in the plurality of enterprises in response to the second configuration changes that are associated with the second machines in the plurality of enterprises;
  determine an actual impact of one or more third configuration changes with regard to a first subset of the first machines in the designated enterprise, the actual impact including:
    an actual change to performance of the first subset of the first machines in the designated enterprise as a result of the one or more third configuration changes, and
    an actual change to a volume of support tickets that are received in response to the one or more third configuration changes with regard to the first subset of the first machines in the designated enterprise;
  infer a predictive impact of the one or more third configuration changes with regard to a second subset of the first machines in the designated enterprise by using an adaptive algorithm to analyze the combined information, the predictive impact including:
    a predicted change to performance of the second subset of the first machines in the designated enterprise as a result of the one or more third configuration changes, and
    a predicted change to a volume of support tickets that are received in response to the one or more third configuration changes with regard to the second subset of the first machines in the designated enterprise;
  generate an estimate of a net financial result of implementing the one or more third configuration changes with regard to the second subset of the first machines in the designated enterprise based at least in part on the actual impact of the one or more third configuration changes with regard to the first subset of the first machines in the designated enterprise and further based at least in part on the predictive impact of the one or more third configuration changes with regard to the second subset of the first machines in the designated enterprise; and based on the generated estimate of the net financial result, increase efficiency of a computing system, which is configured to perform systems management tasks for the designated enterprise that includes the first machines, by causing the computing system to modify at least one third configuration change of the one or more third configuration changes for implementation with regard to the second subset of the first machines in the designated enterprise, wherein the at least one third configuration change includes at least one of:

deployment of software on at least one of the first machines in the second subset, changing hardware on at least one of the first machines in the second subset, changing one or more security settings associated with at least one of the first machines in the second subset, or changing one or more compliance settings associated with at least one of the first machines in the second subset.

18. The computer program product of claim 17, wherein the operations comprise:

determine a cumulative amount of time that productivity of end users of the second subset of the first machines in the designated enterprise is statistically likely to change as a result of the one or more third configuration changes based at least in part on the actual impact and further based at least in part on the predictive impact; and generate the estimate of the net financial result of implementing the one or more third configuration changes with regard to the second subset of the first machines in the designated enterprise based at least in part on a sum of a first portion and a second portion, the first portion being equal to a product of the cumulative amount of time and a cost per unit of time per end user of a first machine in the second subset, the second portion being equal to an estimated cost of resolving support tickets regarding the one or more third configuration changes with regard to the second subset of the first machines in the designated enterprise.

19. The computer program product of claim 18, wherein the cumulative amount of time includes a first amount of time and a second amount of time;

wherein the first portion is equal to a sum of (a) a product of the first amount of time and a first common cost per unit of time per end user in a first subset of the end users of the first machines in the second subset of the first machines in the designated enterprise and (b) a product of the second amount of time and a second common cost per unit of time per end user in a second subset of the end users of the first machines in the second subset of the first machines in the designated enterprise; and wherein the first common cost per unit of time per end user in the first subset of the end users and the second common cost per unit of time per end user in the second subset of the end users are different.

20. The computer program product of claim 17, wherein the operations comprise:

generate the estimate of the net financial result of implementing the one or more third configuration changes with regard to the second subset of the first machines in the designated enterprise by taking into consideration an estimated initial cost associated with implementing the one or more third configuration changes during implementation of the one or more third configuration changes and by taking into consideration an estimated financial benefit that is predicted to occur as a result of the implementation being completed;

wherein the estimated initial cost is based at least in part on at least one of a predicted decrease in the performance of the second subset of the first machines in the designated enterprise or a predicted increase in the volume of the support tickets that are received with regard to the one or more third configuration changes with regard to the second subset of the first machines in the designated enterprise during the implementation of the one or more third configuration changes; and wherein the estimated financial benefit is based at least in part on at least one of a predicted increase in the performance of the second subset of the first machines in the designated enterprise or a predicted decrease in the volume of the support tickets that are received in the designated enterprise after the implementation of the one or more third configuration changes is completed.

\* \* \* \* \*